US012729989B2

(12) United States Patent
Edwards et al.

(10) Patent No.: US 12,729,989 B2
(45) **Date of Patent: *Sep. 8, 2026**

(54) FLOW AND LEVEL MONITOR FOR FLUID SYSTEMS

(71) Applicant: Hydro Radar, LLC, Seneca, SC (US)

(72) Inventors: Gerard Edwards, Seneca, SC (US); Zongbo Wang, Lawrence, KS (US)

(73) Assignee: Hydro Radar, LLC, Seneca, SC (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/530,644

(22) Filed: Dec. 6, 2023

(65) Prior Publication Data

US 2024/0110821 A1 Apr. 4, 2024

Related U.S. Application Data

(63) Continuation of application No. 18/124,919, filed on Mar. 22, 2023, now Pat. No. 11,885,653, which is a continuation-in-part of application No. 17/950,522, filed on Sep. 22, 2022, now abandoned.

(60) Provisional application No. 63/248,029, filed on Sep. 24, 2021.

(51) Int. Cl.
*G01F 1/66* (2022.01)
*G01F 23/284* (2006.01)

(52) U.S. Cl.
CPC .............. *G01F 1/66* (2013.01); *G01F 23/284* (2013.01)

(58) Field of Classification Search
CPC ................................ G01F 1/66; G01F 23/284
USPC .......................................................... 73/861
See application file for complete search history.

(56) References Cited

U.S. PATENT DOCUMENTS

| | | | |
|---|---|---|---|
| 5,315,880 | A | 5/1994 | Bailey |
| 5,811,688 | A | 9/1998 | Marsh et al. |
| 5,821,427 | A | 10/1998 | Byrd |
| 5,960,097 | A | 9/1999 | Pfeiffer et al. |

(Continued)

FOREIGN PATENT DOCUMENTS

| | | | |
|---|---|---|---|
| CN | 102564508 | B | 12/2013 |
| CN | 105067058 | A | 11/2015 |

(Continued)

OTHER PUBLICATIONS

NivuFlow 550 Radar Flow Measurement. Website published Sep. 5, 2016. Downloaded from https://www.nivus.com/en/products-solutions/measurement-systems/flow-measurement-for-liquids/flow-meters-part-filled/flow-sensors/ofr-radar-sensor on Apr. 12, 2023 (3 pages).

(Continued)

*Primary Examiner* — Peter J Macchiarolo
*Assistant Examiner* — Rodney T Frank
(74) *Attorney, Agent, or Firm* — Nelson Mullins Riley & Scarborough LLP

(57) ABSTRACT

A system for observing a flow characteristic of a fluid is provided. The system comprises at least one radar sensor that is a Multiple-Input Multiple Output phase radar sensor configured to create a virtual array. The system also comprises processing circuitry. The radar sensor(s) are provided at a distance above the fluid. The processing circuitry is configured to receive sensor data from the radar sensor(s). The sensor data includes at least one of a fluid speed or a fluid surface level. The processing circuitry is configured to determine the flow characteristic based upon the sensor data.

20 Claims, 23 Drawing Sheets

(56) References Cited

U.S. PATENT DOCUMENTS

| | | | |
|---|---|---|---|
| 9,778,082 B2 | 10/2017 | Baer et al. | |
| 9,945,709 B2 | 4/2018 | Fehrenbach et al. | |
| 10,161,770 B2 | 12/2018 | Rick et al. | |
| 10,295,385 B2 | 5/2019 | Rick et al. | |
| 10,408,648 B2 | 9/2019 | Rick et al. | |
| 10,444,255 B2 | 10/2019 | Lüthi et al. | |
| 10,488,245 B2 | 11/2019 | Gelada Camps et al. | |
| 10,571,315 B2 | 2/2020 | Rick | |
| 10,704,934 B2 | 7/2020 | Sevar | |
| 10,705,198 B2 | 7/2020 | Santra et al. | |
| 10,768,287 B2 | 9/2020 | Xu et al. | |
| 11,255,956 B2 | 2/2022 | Corbe et al. | |
| 11,885,653 B2 * | 1/2024 | Edwards | G01F 1/002 |
| 2011/0000311 A1 | 1/2011 | Petroff | |
| 2016/0131752 A1 | 5/2016 | Jansen et al. | |
| 2017/0249417 A1 | 8/2017 | Gosieski, Jr. et al. | |
| 2019/0086247 A1 | 3/2019 | Rick | |
| 2020/0309926 A1 | 10/2020 | Thayer et al. | |
| 2020/0326219 A1 | 10/2020 | Whitehead et al. | |
| 2020/0386601 A1 | 12/2020 | Waelde et al. | |
| 2021/0026001 A1 | 1/2021 | Welle et al. | |
| 2022/0252441 A1 | 8/2022 | Shin | |
| 2023/0101202 A1 | 3/2023 | Edwards et al. | |

FOREIGN PATENT DOCUMENTS

| | | | |
|---|---|---|---|
| CN | 110530441 | B | 11/2020 |
| CN | 113532590 | A | 10/2021 |
| CN | 111798386 | B | 3/2022 |
| EP | 0792441 | A2 | 9/1997 |
| GB | 2376740 | A | 12/2002 |
| JP | H05275920 | A | 10/1993 |
| JP | H11351924 | A | 12/1999 |
| JP | 2009503919 | A | 1/2009 |
| JP | 2011513745 | A | 4/2011 |
| JP | 2016114358 | A | 6/2016 |
| JP | 2017104476 | A | 6/2017 |
| JP | 6270705 | B2 | 1/2018 |
| JP | 2020503519 | A | 1/2020 |
| KR | 101856186 | B1 | 5/2018 |
| KR | 102037873 | B1 | 10/2019 |
| KR | 10-2233671 | B1 | 3/2021 |
| KR | 102365920 | B1 | 2/2022 |
| WO | 2001051897 | A1 | 7/2001 |
| WO | 2020089395 | A1 | 5/2020 |
| WO | 2020148461 | A1 | 7/2020 |
| WO | 2020180673 | A1 | 9/2020 |
| WO | 2020218258 | A1 | 9/2021 |

OTHER PUBLICATIONS

Zhen Zhang, Yang Zhou, Haiyun Liu, Hongmin Gao; "In-situ water level measurement using NIR-imaging video camera," Flow Measurement and Instrumentation, Jun. 2019, pp. 95-106, vol. 67, Elsevier, China, downloaded from https://www.sciencedirect.com/science/article/pii/S0955598618302814 on Apr. 12, 2023. (29 pages).

International Search Report and Written Opinion for International application No. PCT/US2022/044353; Dated Feb. 27, 2023; 18 pages.

Search Report issued by the Intellectual Property Office of the United Kingdom for Application No. GB2304238.5 mailed Sep. 11, 2023.

Japanese Office Action (Rejection Notice), for Application No. JP2024-518578, dated Jul. 29, 2025, 5 pages.

Office Action dated Aug. 28, 2025, for corresponding Canadian Patent Application No. 3232820, 6 pages.

Office Action dated Feb. 3, 2026, for corresponding Canadian Application No. 3232820, 5 pages.

Xuchen Li, Ronghao Lin & Hing Cheung So, "Sparse array design for MIMO Radar in Multipath Scenarios", Proceedings of 2024 IEEE International Conference on Acoustics, Speech and Signal Processing Workshops (ICASSPW) Held Apr. 14-19, 2024 in Seoul, Korea (IEEE, 2024) 239.

Meng-en Ma, Yueli Li, Xiaoqing Jiang & Xiaotao Huang, "Hydrological Information Measurement Using an MM-Wave FMCW Radar," International Conference on Microwave and Millimeter Wave Technology (ICMMT), 2020 (2020 IEEE), (DOI: 10.1109/ICMMT49418.2020.938510), 3 pages, 978-1-7281-5733-7/20, National University of Defense Technology, Changsha, China.

TI Design: TIDA-020011 "Automotive mmWave Radar Gesture Control Reference Design", TIDUEH0, Texas Instruments, Nov. 2018.

Rick Gentile, "Algorithms to Atenna : Increasing Angular Resolution Using MIMO Radar," Microwaves and RF Online, avalable at https://www.mwf.com/technologies/embedded/systems/article/21849496agorithms-to-atenna-increasing-angular-resolution-using-mimo-radar, 2018.

Office Action from Japanese Patent Application No. 2024-518578, issued Jul. 7, 20206 (6 pages).

* cited by examiner

Provide Monitor
1202

↓

Provide and Position Angle Flow Sensor
1203A

↓

Provide and Position Nadir-Facing Sensor
1203B

↓

Determine Position for Monitor in Pipe System
1204

↓

Install Monitor at Position so that Monitor Will Reflect Signal Off Walls
1206

↓

Cause Signals to be Transmitted from Monitor
1208

↓

Receive Sensor Data
1210

↓

Determine a Flow Characteristic
1212

FLOW AND LEVEL MONITOR FOR FLUID SYSTEMS

CROSS-REFERENCE TO RELATED APPLICATION

This application is a continuation of U.S. Non-provisional patent application Ser. No. 18/124,919, filed on Mar. 22, 2023, entitled "FLOW AND LEVEL MONITOR FOR FLUID SYSTEMS", which claimed priority as a continuation-in-part of U.S. Non-provisional patent application Ser. No. 17/950,522, filed on Sep. 22, 2022, entitled "FLOW AND LEVEL MONITOR FOR FLUID SYSTEMS", which claims priority to U.S. Provisional Patent Application No. 63/248,029, filed on Sep. 24, 2021, entitled "FLOW AND LEVEL MONITOR FOR FLUID SYSTEMS", each of which is incorporated herein in their entireties.

FIELD OF THE DISCLOSURE

The present disclosure relates to devices, systems, and methods for monitoring flow rates, velocities, and/or levels of fluid systems.

BACKGROUND OF THE DISCLOSURE

Properties of fluid systems have traditionally been measured by pressure sensors or level sensors that come in contact with the fluids to be measured. For example, measurement equipment such as bottom-mounted pressure transducers and acoustic doppler flow sensors have been used, but these pieces of equipment have significant exposure to a measured fluid. This exposure causes wear on the measurement equipment and reduces the reliability and operating life of the equipment. Consequently, workers may be required to enter the fluid environment more regularly, further increasing the maintenance costs related to the measuring equipment.

Further, in the context of sewage systems, stormwater systems, and other drainage systems, entry into the fluid environment is often a dangerous, time consuming, and very expensive process. These environments often have limited space, and the environments commonly possess hazardous material, making exposure to fluids or gasses generated by the fluids to be dangerous. Regulations and laws exist in many countries as to the requirements for entry into these confined spaces. For example, most countries require portable gas detectors, ventilation systems, and tripods with hoists and a harness so as to allow the worker in the manhole to be quickly raised up by two additional other people in case of endangerment. These restrictions create significant labor and equipment costs. Further, above-fluid sensors often need to be positioned proximate to the fluid being measured, and this may be problematic where the fluid may potentially rise to the level of the above-fluid sensor.

Additionally, measurement equipment is often required to be installed in a particular manner, and this may increase the difficulty in installation of this equipment. This may also increase the length of time that a worker is required to spend in the fluid environment. Further, measurement equipment must be calibrated prior to actual use, and this calibration process can often be burdensome for users. Users are often required to manually calibrate the equipment and then manually adjust the setup based on the calculated calibration values. By requiring users to complete this process, significant issues arise. The potential for human error is high, increasing the likelihood of incorrect calibration. Additionally, these calibration processes receive limited inputs, limiting the accuracy of any installed measurement equipment.

Existing measurement equipment also possesses limited accuracy, and this is the case for several reasons. First, the systems often use a single sensor in attempt to measure the flow properties at a certain location. These systems fail to take into account the variation in flow properties at different nearby locations. For example, traditional sensors may obtain the flow properties at the center of a flow channel within a pipe, and flow properties at other positions within the pipe may be calculated based on theoretical values. The velocity of fluid at a position adjacent to a wall of the pipe may, for example, be calculated based on the velocity detected by the sensor. While this provides an estimate of the flow properties, the accuracy is limited. Further, it fails to take into account other factors such as residue build-up on pipes, turbulent flow, etc. that may further reduce the accuracy of calculations.

BRIEF SUMMARY OF THE DISCLOSURE

Several embodiments described herein are related to monitors for observing characteristics of the flow of fluids. In various embodiments, a monitor may be provided that is configured to measure the flow rate and level of fluids in non-pressurized pipe systems. The monitor may be deployed above a measured fluid, and the monitor may measure the fluid level and the surface velocities of the fluid. Processing circuitry located in the monitor or elsewhere may calculate the flow properties based upon the sewer level, site geometries, and surface velocity measurements, but other factors may also be considered in making the calculations.

The monitor may operate through the use of radar technology. A nadir-facing sensor and an angle flow sensor may utilize radar technology to measure a surface velocity of the measured fluid. Additionally, a nadir-facing sensor (which may or may not be the same sensor used to measure surface velocity) may measure the liquid level. In some embodiments, the system uses a Multiple-Input Multiple-Output (MIMO) phase radar with a virtual array. This MIMO phase radar may permit the system to create a three-dimensional image of the water surface having improved spatial resolution for multi-point surface velocity measurements and for environmental characterization.

Monitors and systems described herein may also utilize other sensors. For example, an inertial measurement unit (IMU) sensor and/or an absolute orientation sensor may be utilized. This IMU sensor and/or an absolute orientation sensor, in combination with an angled-looking radar, may permit self-characterization of the surrounding environment to determine the monitor's mounting orientation, the pipe angle, the pipe diameter, and/or the fluid surface roughness. Where this self-characterization is provided, the need for user input of parameters may be minimized when calculating flow volume from radar surface velocity and liquid level measurements. By reducing the need for user input, the overall ease of use may be improved, and the installation time may be reduced.

The monitors and systems described herein may provide industry-leading accuracy. Higher frequency operation at levels above sixty (60) gigahertz and combination fast Fourier transform (FFT) processing may be used in some embodiments, and this may result in an improved resolution of flow measurements. In some embodiments, the monitor may include a Linear Frequency Modulating Continuous Waveform Wavelength (LFMCW) radar system, and echo signals may be processed through one or more Fast Fourier Transforms. For example, echo signals may be processed through a combination of a two-dimensional (2D) FFT and a Zoom FFT. Additionally, flow and nadir-facing sensors may operate at a frequency of fifty (50) gigahertz or higher. In some embodiments, the flow and nadir-facing sensors may even operate at a frequency of sixty (60) gigahertz or higher. For example, in one embodiment, a frequency of sixty (60) gigahertz may be utilized as a central frequency for angled-looking flow measurement, and a frequency of seventy-seven (77) gigahertz may be utilized as central frequency for nadir-facing level measurement. Others have tended to avoid using such high frequency signals for flow measurements.

Monitors may be useful in sewer and stormwater systems. However, in some embodiments, the monitors may be utilized in other environments to measure irrigation channels, open channels (e.g., rivers, ponds, lakes, etc.), tank systems, and other fluids.

Several embodiments described herein provide a monitor above the fluid that it is measuring. In this way, the monitor may have less direct exposure to the fluid as compared to bottom-mounted pressure transducers and/or acoustic doppler flow sensors. This may increase the reliability and operating life of the monitors. Additionally, due to the increased reliability of monitors disposed outside of the measured fluid, the amount of times that workers must enter the environment may be reduced, which may lead to reduced maintenance costs. Additionally, a radar device may remain stationary once mounted, avoiding physical rotations which can cause damage, displacement, and/or increased wear and tear.

In various embodiments, information obtained from a monitor may be communicated to a user device, or this information may be processed to form refined information that may be presented to the user. For example, the depth and velocity values may be obtained at the monitor and communicated to a user device for presentation to the user, and the depth and velocity values may also be used to generate a three-dimensional image of the fluid surface that may be presented to the user, plots showing the velocity of the fluid, piping diagrams to show operating information at various locations, etc. Displays may permit a user to easily select their desired information for presentation.

In an example embodiment, a system for observing a flow characteristic of a fluid is provided. The system comprises a nadir-facing sensor, an angle flow sensor, and processing circuitry. The nadir-facing sensor and the angle flow sensor are both provided at a distance above the fluid, and the nadir-facing sensor and the angle flow sensor are both Multiple-Input Multiple-Output phase radar sensors. The processing circuitry is configured to receive sensor data from the nadir-facing sensor and the angle flow sensor. The sensor data includes at least one of a fluid speed or a fluid surface level, and the processing circuitry is configured to determine the flow characteristic based upon the sensor data.

In some embodiments, the system further comprises a monitor, and the nadir-facing sensor and the angle flow sensor are both positioned in the monitor. Additionally, in some embodiments, the monitor comprises a first portion defining a first wall and a second portion defining a second wall. The first wall is sloped at an angle relative to the second wall, and the first portion has an increased cross-sectional size relative to the second portion. The angle flow sensor is positioned in the first portion proximate to the first wall and is configured to emit angled radar signals through the first wall. Additionally, in some embodiments, the nadir-facing sensor is positioned in the second portion proximate to the second wall and is configured to emit radar signals through the second wall. Furthermore, in some embodiments, the first wall and the second wall are both at least partially transparent or semi-transparent. In some embodiments, the processing circuitry is provided within the monitor. In some embodiments, the processing circuitry is not provided within the monitor.

In some embodiments, the system comprises a plurality of monitors. Additionally, in some embodiments, the nadir-facing sensor and the angle flow sensor both comprise a plurality of transmitters and receivers. In some embodiments, the nadir-facing sensor and the angle flow sensor both comprise plurality of transceivers. In some embodiments, the system comprises an inertial measurement sensor.

In some embodiments, the nadir-facing sensor and the angle flow sensor are both configured to operate at a frequency of 50 GHz or higher. Additionally, in some embodiments, the nadir-facing sensor is configured to operate at a frequency of 77 GHz or higher.

In some embodiments, the processing circuitry is configured to utilize machine learning to identify flood overflow conditions and also determine flow properties utilizing at least one of the fluid speed, the fluid surface level, and data regarding the surrounding environment. Furthermore, in some embodiments, the angle flow sensor is configured to transmit radar signals that reflect off of a wall or a reflector on the wall.

Additionally, in some embodiments, a method for using a monitor is provided. The method comprises providing a monitor having processing circuitry. The monitor is configured to be provided at a distance above the fluid being measured. The method also comprises providing an angle flow sensor, and the angle flow sensor is a radar sensor. The method also comprises positioning the angle flow sensor in the monitor, determining a position for the monitor in a non-pressurized pipe system, and installing the monitor at the position so that the monitor is configured to reflect radar signals off of a wall in the non-pressurized pipe system. The processing circuitry is configured to receive sensor data from the angle flow sensor, and the sensor data includes at least one of a fluid speed or a fluid surface level.

In some embodiments, the method also comprises causing signals to be transmitted from the monitor and determining a flow characteristic based upon the sensor data. Additionally, in some embodiments, the position is higher above a fluid in the non-pressurized pipe system relative to an alternative position where the monitor is configured to direct radar signals into the fluid without reflecting radar signals off of a wall.

In some embodiments, the monitor comprises a first portion defining a first wall and a second portion defining a second wall. The first wall is sloped at an angle relative to the second wall, the first portion has an increased cross-sectional size relative to the second portion, and the angle flow sensor is positioned in the monitor at the first portion proximate to the first wall so that the angle flow sensor is configured to emit angled radar signals through the first wall when activated. Additionally, in some embodiments, the method also comprises providing a nadir-facing sensor and positioning the nadir-facing sensor in the monitor, and the nadir-facing sensor is positioned in the monitor at the second portion proximate to the second wall so that the nadir-facing sensor is configured to emit radar signals through the second wall when activated.

Other features of the present invention and combinations of features will become apparent from the detailed description to follow, taken in conjunction with the accompanying drawings.

BRIEF DESCRIPTION OF THE SEVERAL VIEWS OF THE DRAWING(S)

For the purpose of illustrating the invention, the drawings show forms that are presently preferred. It should be understood that the invention is not limited to the precise arrangements and instrumentalities shown in the drawings.

DETAILED DESCRIPTION OF THE DISCLOSURE

Various embodiments described herein are related to a monitor for detecting information about the flow and level of fluid.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may. As used herein, "position" may refer to a rotational position or orientation of an object and "position" may additionally or alternatively refer to a linear position (e.g., in Cartesian coordinates).

Figure 1:
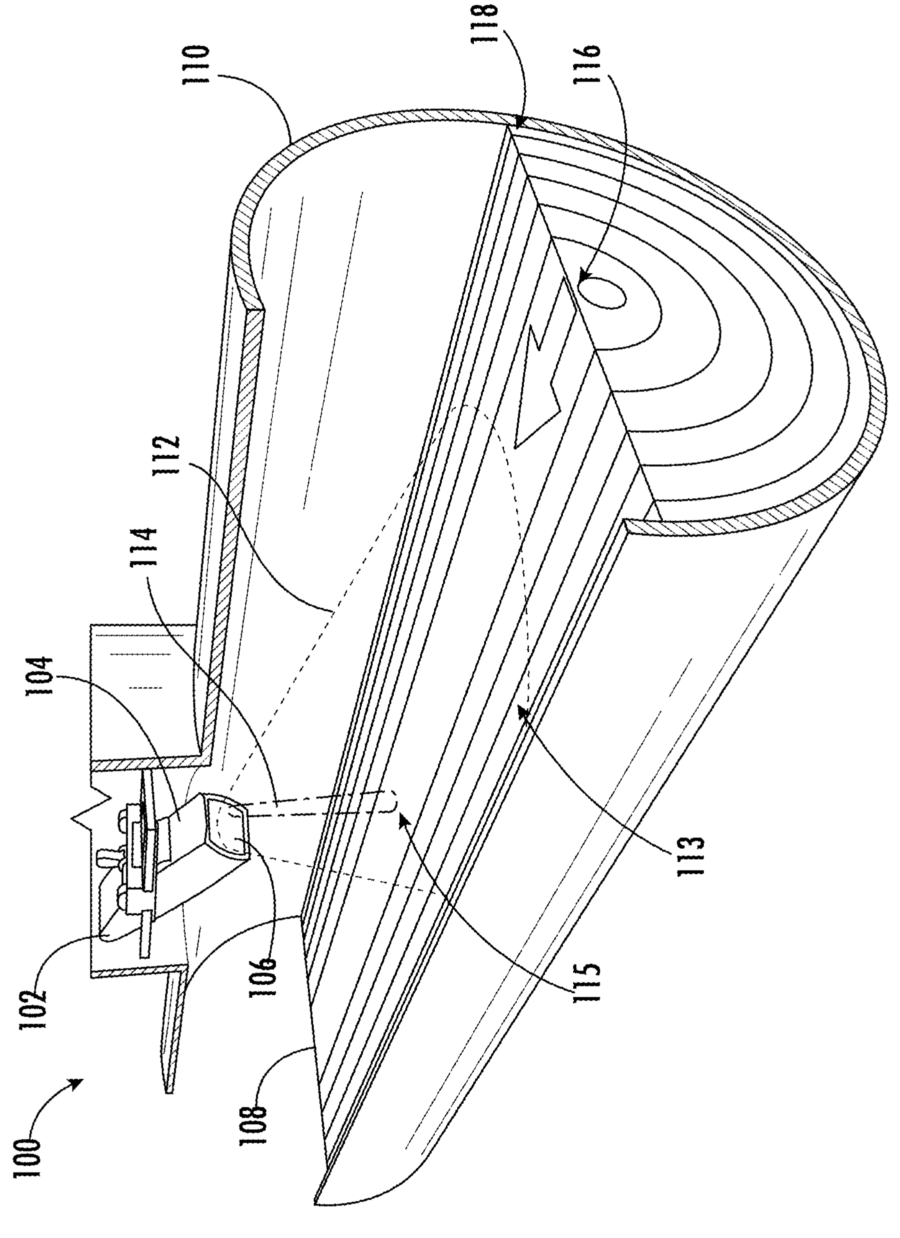
FIG. 1 is a perspective view illustrating an example monitor deployed in a non-pressurized pipe system, in accordance with some embodiments herein.

Various embodiments described herein relate to a monitor and associated systems using a monitor. FIG. 1 illustrates a schematic view of an example system 100 including a monitor 102 to obtain information on the flow properties of a fluid 108. In some embodiments, the monitor 102 may include a nadir-facing sensor 104. This nadir-facing sensor 104 may be configured to create a nadir-facing sensor signal path 114, and this nadir-facing sensor 104 may provide information about the fluid 108 at a first coverage area 115. Data obtained from the nadir-facing sensor 104 may be utilized to determine the fluid level, and this data may also be used with or without data from other sensors to determine the fluid velocity, speed, direction, etc. The nadir-facing sensor 104 can be used in stormwater environments, sewers, open channel environments, etc. The nadir-facing sensor 104 may be a radar sensor in some embodiments. This nadir-facing sensor 104 may have an accuracy of +/−0.125 inches or better, and the nadir-facing sensor 104 may also have a range of approximately one hundred (100) feet in some embodiments.

In some embodiments, an angled sensor 106 may also be provided. The angled sensor 106 may be configured to create an angled sensor signal path 112, and this angled sensor 106 may provide information about the fluid 108 at a second coverage area 113. The angled sensor 106 may directed at an angle relative to the surface of the fluid 108, and it may be used in conjunction with the nadir-facing sensor 104 to determine various properties of the fluid such as the fluid velocity. The angled sensor 106 may be a radar sensor. The angled sensor 106 may have an accuracy of +/−0.03 feet per second or better. In some embodiments, the nadir-facing sensor 104 and the angled sensor 106 may measure flow velocities ranging from 0.3 feet per second to fifty (50) feet per second, but other ranges may also be measured. Additionally, the nadir-facing sensor 104 and the angled sensor 106 may simply provide a speed value, or it may provide a velocity value (which has a speed and associated flow direction). By providing nadir-facing sensors 104 and angled sensors 106 with such a high accuracy, the overall accuracy of volume estimation may be greatly improved. For the angled sensor to function properly, the fluid that is being measured may be required to have small waves or ripples with a height of 0.125 inches or greater.

Figure 9:
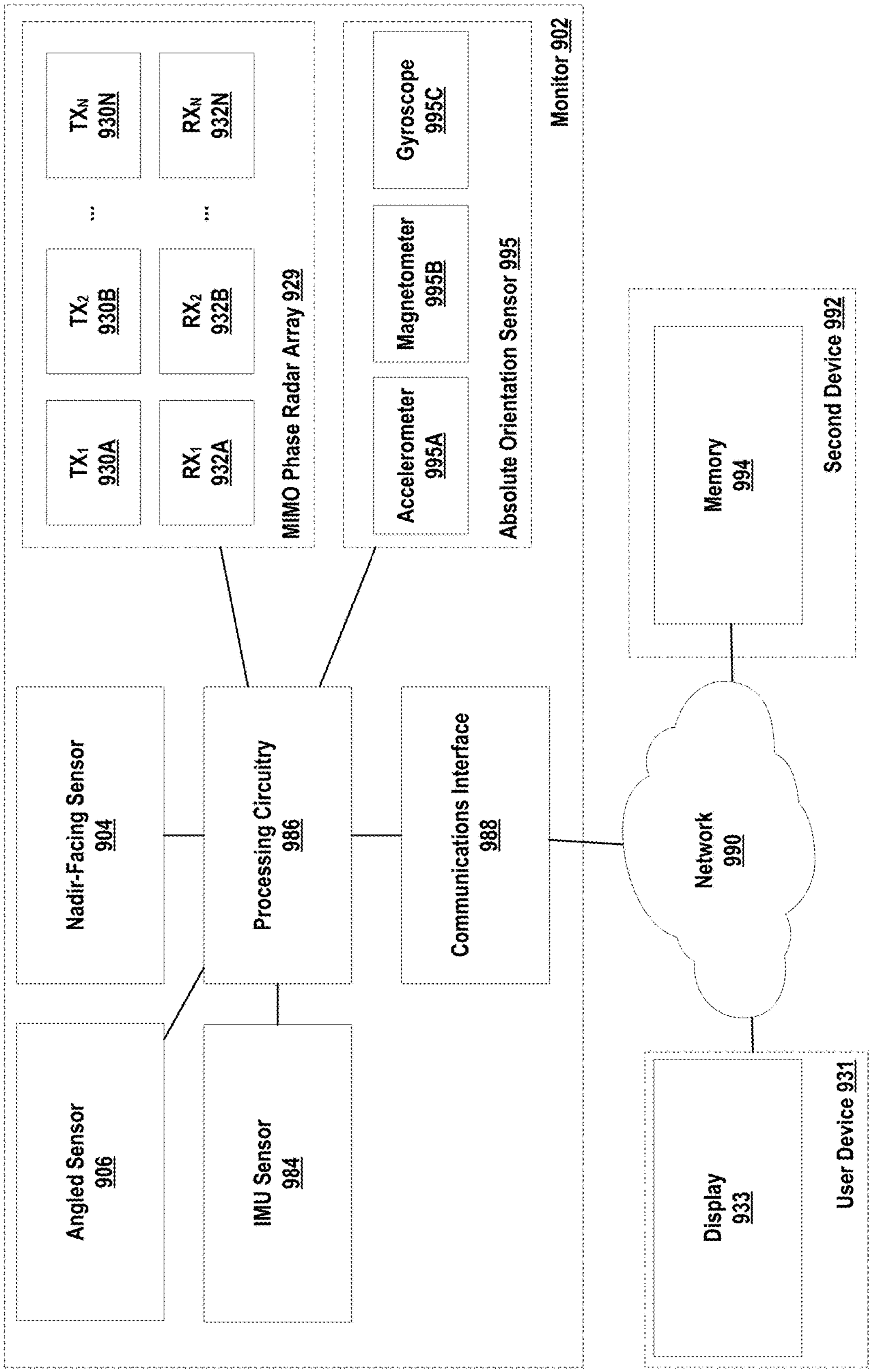
FIG. 9 is a block diagram illustrating various components of an exemplary system, in accordance with some embodiments herein.

An IMU sensor 984 (see FIG. 9) may be provided in the monitor 102 in some embodiments. An absolute orientation sensor 995 (see FIG. 9) may also be provided. The absolute orientation sensor 995 may provide an absolute orientation using an accelerometer 995A (see FIG. 9), a magnetometer 995B (see FIG. 9), and a gyroscope 995C (see FIG. 9) within the monitor 102. This absolute orientation sensor 995 may be provided as an alternative to the IMU sensor 984 in some embodiments, but the absolute orientation sensor 995 and the IMU sensor 984 may both be included in a monitor in some embodiments as illustrated in FIG. 9, and this may be beneficial to provide redundancy.

This IMU sensor 984 and/or the absolute orientation sensor 995 may assist in obtaining information or self-characterizing the deployment environment. Through the use of the IMU sensor 984 and/or the absolute orientation sensor 995, the deployment mounting angle and orientation of the monitor 102, the pipe angle, the pipe diameter, and/or the water surface roughness may be obtained at a high level of accuracy. Use of this IMU sensor 984 and/or the absolute orientation sensor 995 may permit a user to install the monitor 102 in a wide variety of orientations, and the IMU sensor 984 and/or the absolute orientation sensor 995 may provide information that may permit the orientation to be recognized and that may permit measurements to be adjusted accordingly. Use of this IMU sensor 984 and/or the absolute orientation sensor 995 may also reduce the amount of input information that an installer must provide during the initial setup of a monitor 102, making the monitor 102 easier to install. Additionally, if the position of the monitor 102 changes over time, the IMU sensor 984 and/or the absolute orientation sensor 995 may detect these changes and modify the received measurements accordingly.

The system and the monitor 102 may have both a nadir-facing sensor 104 and an angled sensor 106 in some embodiments. However, the monitor 102 may initially be provided with only a nadir-facing sensor 104 activated in some embodiments, and an angled sensor 106 can be activated with an added online purchase. Sensors 104, 106 and other sensors may be housed in an enclosure such as an IP68 or better enclosure. Using data from the nadir-facing sensor 104 and the angled sensor 106, the monitor 102 and associated systems may send data with the fluid levels and alarms with overflow or high level alerts.

In the illustrated embodiment, the monitor 102 is used to obtain information about the flow properties of a fluid 108 flowing within a pipe 110. Within this pipe 110, the flow properties may vary from one location to the next. Liquid flow in sewer and stormwater systems has waves or turbulence, but this liquid flow typically remains relatively flat. However, variations in flow properties may arise from blockages or residue present at certain portions of the pipe 110, and this may cause variation in flow properties in the longitudinal direction and along the cross-section of the pipe. For example, baby wipes or other materials may cause blockages. Additionally, fluid velocities may be reduced proximate to edge portions 118 of the pipe 110 relative to the fluid velocities at the central portion 116 of the pipe 110. The monitor 102 described herein may be used to effectively determine the fluid properties and/or the change of topography at various locations within the pipe, accounting for these variations. Additionally, the monitor 102 may assist in determining areas where blockages may exist or where blockages may be forming, and this may be done by using prior imaging of the environment.

Figure 2A:
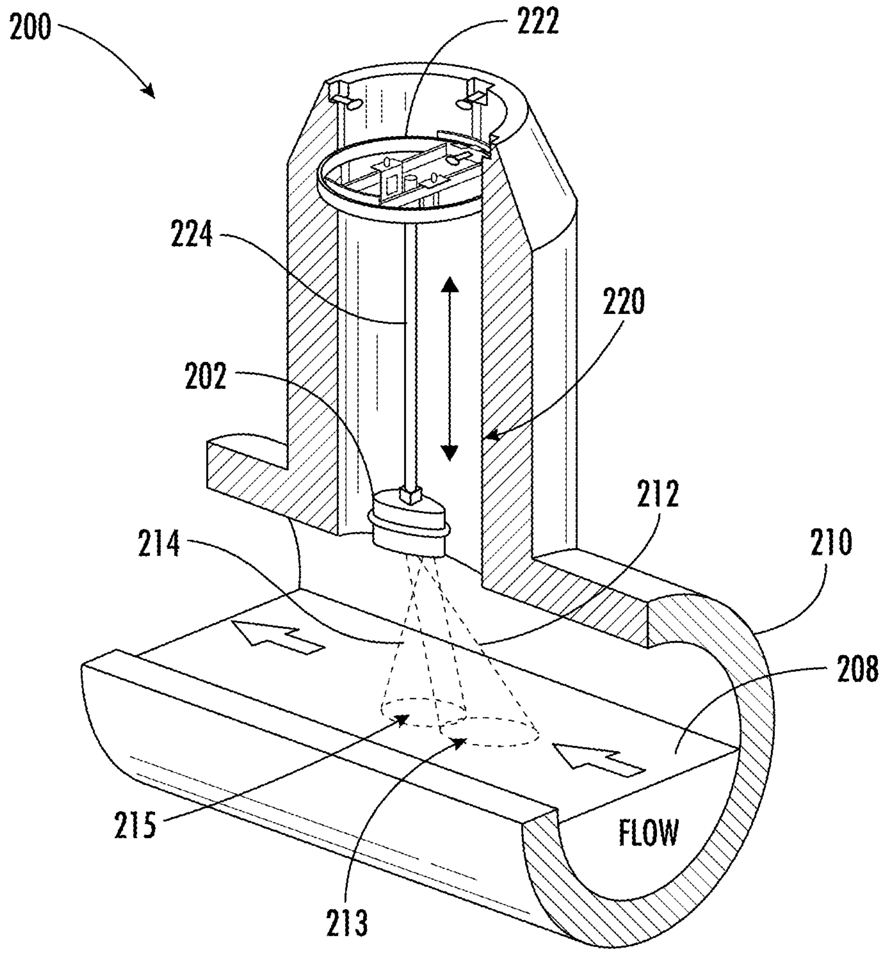
FIG. 2A is a schematic view illustrating another example monitor deployed in a non-pressurized pipe system, in accordance with some embodiments herein.

FIG. 2A illustrates a schematic view of another example system 200 including a monitor 202 to obtain information on the flow properties of a fluid 208. In the illustrated embodiment, the monitor 202 is used to obtain information about the flow properties of a fluid 208 flowing within a pipe 210. In some embodiments, the monitor 202 may include a nadir-facing sensor 104 (see FIG. 1). This nadir-facing sensor 104 may be configured to create a nadir-facing sensor signal path 214, and this nadir-facing sensor 104 may provide information about the fluid 208 at a first coverage area 215.

In some embodiments, an angled sensor 106 (see FIG. 1) may also be provided. The angled sensor 106 may be configured to create an angled sensor signal path 212, and this angled sensor 106 may provide information about the fluid 208 at a second coverage area 213.

A monitor 202 may be installed at a wide variety of locations. The monitor 202 may detect properties of the fluid 208 while remaining at a distance away from the fluid 208. For example, the monitor 202 may be provided one (1) foot to one hundred (100) feet away from the fluid 208. In this way, the monitor 202 may have less exposure to the fluid 208, and the monitor 202 may be subject to less wear over time. Thus, the monitor 202 may have an increased lifespan and increased reliability. This may reduce costs for various reasons. Monitors 202 will not need to be replaced as often, and workers will be required to perform less maintenance on the monitors 202, reducing expenses.

In the illustrated embodiment of FIG. 2A, the monitor 202 is disposed within a cavity 220 in the pipe 210. A mount 222 is provided in the cavity 220, and the monitor 202 may be shifted up or down through the use of a retractable rail 224. Generally, the monitor 202 may remain stationary once it has been secured to the mount 222. Thus, physical movement or rotation may be avoided to prevent the risk of damage and displacement. Even where the monitor 202 is shifted, an IMU sensor 984 (see FIG. 9) and/or an absolute orientation sensor 995 (see FIG. 9) may assist in recalibrating the monitor 202 so that provided data and calculations maintain a high accuracy.

Figure 2B:
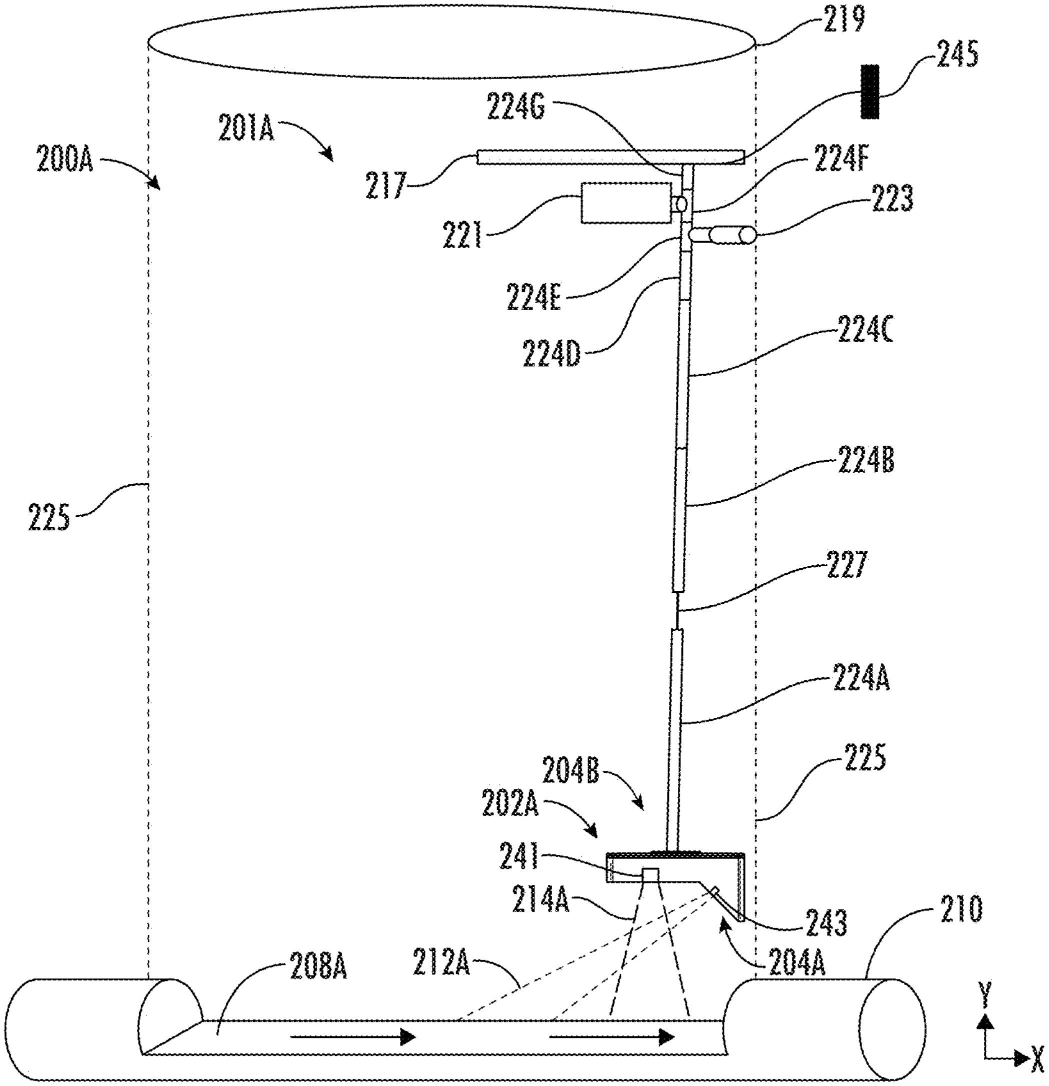
FIG. 2B is a schematic view illustrating an example monitor deployed in a non-pressurized pipe system, in accordance with some embodiments herein.

Looking now at FIG. 2B, an example radar system 201A is shown that is deployed in a non-pressurized pipe system 200A such as a sewer system. The radar system 201A is provided in the non-pressurized pipe system 200A between sewer walls 225, with the monitor 202A of the radar system 201A positioned above a flow channel 210. The non-pressurized pipe system 200A may possess a manhole 219 to provide access to the radar system 201A, but access may be provided in other forms.

The monitor 202A comprises a nadir-facing sensor 241, which may serve as a range radar sensor. The monitor 202A also comprises an angled sensor 243, which may serve as a flow radar sensor. The nadir-facing sensor 241 is directed in a nadir-direction, and the nadir-facing sensor 241 is configured to generate a nadir-facing sensor signal path 214B. The angled sensor 243 is provided at an angle relative to the nadir-facing sensor 241, and the angled sensor 243 is configured to generate an angled sensor signal path 212A.

In FIG. 2B, a brace 217 is utilized to attach the remainder of the radar system 201A to a sewer wall 225, and the seventh rail section 224G is attached to the brace 217. The brace 217 is only connected to the sewer wall 225 at one end of the brace 217, with the brace 217 effectively acting as a cantilever beam. However, in other embodiments, the brace 217 may extend may be connected to the sewer walls 225 at multiple locations to provide increased support for the brace 217.

A battery box 221 is provided at a distance away from the monitor 202A in FIG. 2B. The battery box 221 is attached to the sixth rail section 224F, and one or more of the wires 227 extend from the battery box 221 to the monitor 202A to provide power to the monitor 202A. However, in other embodiments, the battery box 221 may be positioned at other locations. For example, the battery box 221 may be positioned adjacent to the monitor 202A in other embodiments. Electrical components may be provided in the battery box 221. Due to the presence of electrical components in the battery box 221, placement of the battery box 221 at elevated locations may be beneficial to avoid exposing these components to the fluid 208A.

The radar system 201A may comprise a plurality of rail sections. In the radar system 201A of FIG. 2B, a first rail section 224A, a second rail section 224B, a third rail section 224C, a fourth rail section 224D, a fifth rail section 224E, a sixth rail section 224F, and a seventh rail section 224G are provided. Each of the rail sections 224A-224G are snap-together rail sections in FIG. 2B. However, the rail sections 224A-224G may include threading and MAY be connected to each other by threaded engagement, the rail sections 224A-224G may be connected to each other via fasteners, or the rail sections 224A-224G may be connected together in other ways. Connectors between rail sections may be low-loss connectors that do not degrade signals in wires 227 or that degrade the signals in wires 227 only minimally.

The rail sections 224A-224G, have different lengths in FIG. 2B. For example, the first rail section 224A is longer than the other rail sections 224B-224G. The second rail section 224B and the third rail section 224C are also both longer than the fourth rail section 224D, the fifth rail section 224E, the sixth rail section 224F, and the seventh rail section 224G. However, in other embodiments, the rail sections 224A-224G may each possess the same length.

In some embodiments, rail sections 224A-224G may be telescoping rail sections that are configured to slide into each other. The ability to use telescoping rail sections may be beneficial to allow the monitor 202A to be raised and lowered in an automated or semi-automated manner. For example, a user may simply press a button to raise or lower the monitor 202A, and the telescoping rail sections may slide relative to each other. The ability to raise and lower the monitor 202A in an automated or semi-automated manner may decrease the length of time that a worker is required to spend in the fluid environment, lowering maintenance costs and reducing the chance of exposure to hazardous material in the fluids. Where telescoping rail sections are used, O-rings or other components may be provided to effectively seal the telescoping rail sections relative to each other so that the inner contents of the telescoping rail sections such as wires 227 are protected from water, moisture, dust, and other substances. Additionally, where rail sections 224A-224G are telescoping rail sections, the cross-sectional sizes of the rail sections 224A-224G in a plane parallel to the X-Z plane may be different. For example, the cross-sectional size of the first rail section 224A in a plane parallel to the X-Z plane may be different from the cross-sectional size of the second rail section 224B in a plane parallel to the X-Z plane.

The use of a plurality of rail sections may be beneficial to enable rapid deployment of the radar system at a level appropriate for a particular system. For example, an installer may deploy the monitor 202A at an elevated height by removing one or more of the rail sections 224A-224G, and an installer may deploy the monitor 202A at a lower height by adding one or more of the rail sections 224A-224G.

The rail sections 224A-224G possess a recess extending through the center of the rail sections 224A-224G, and wires 227 are received in the rail sections 224A-224G. These wires 227 comprise a data wire, a power wire, and an antenna wire. The data wire connects the monitor 202A to a data source, the power wire connects the radar system to a power source (e.g., in the battery box 221), and the antenna wire connects the radar system to an antenna 245. However, in other embodiments, only one wire may extend through the rail sections 224A-224G. Alternatively, additional wires or wires of different types may extend through the rail sections 224A-224G. For example, multiple data wires may extend through the rail sections 224A-224G. In FIG. 2B, the first rail section 224A and the second rail section 224B are disconnected from each other so that the wires 227 may be seen, but the first rail section 224A and the second rail section 224B may be connected when the radar system 201A is deployed for use.

The non-pressurized pipe system 200A also comprises the antenna 245. This antenna 245 is provided as an external antenna in FIG. 2B. The antenna 245 may be an external cellular antenna, but the antenna 245 may be provided for radio communication or other types of communication in other embodiments.

A sensor 223 is also provided. The sensor 223 is a hydrogen sulfide ($H_2S$) sensor. Upon detection of a $H_2S$ gas level outside of an acceptable range (which may be set by the user or set by default), a processor in the non-pressurized pipe system 200A may cause a signal to be transmitted to alert an operator of the $H_2S$ level. Other sensors may be utilized in addition to a $H_2S$ sensor or as an alternative to the $H_2S$ sensor, and these sensors may include a method ($CH_4$) sensor, an oxygen sensor, a nitrous oxide sensor, a sulfur oxide sensor, a carbon dioxide sensor, a chlorine sensor, a gasoline sensor, and an industrial solvent sensor, and the inclusion of one or more of these additional sensors may further protect the health of workers in the non-pressurized pipe system 200A and to detect illegal discharges into the non-pressurized pipe system 200A.

The monitor 202A may be provided with a first portion 204A and a second portion 204B. The first portion 204A may have an increased cross-sectional size relative to the second portion 204B in a plane extending along the Y-Z plane in FIG. 2B. By providing the first portion 204A having an enlarged size, the angled sensor 243 may be easily positioned within the first portion 204A so that angled sensor 243 is configured to emit radar signals at the desired angle (e.g., 45 degrees relative to the X-Z plane in FIG. 2B). The monitor 202A may be oriented such that the first portion 204A is positioned proximate to a sewer wall 225 as illustrated in FIG. 2B. By doing so, the angled sensor 243 may be provided at a greater elevation above the fluid 208A as compared to where the first portion 204A is positioned further away from the sewer wall 225.

Figure 3:
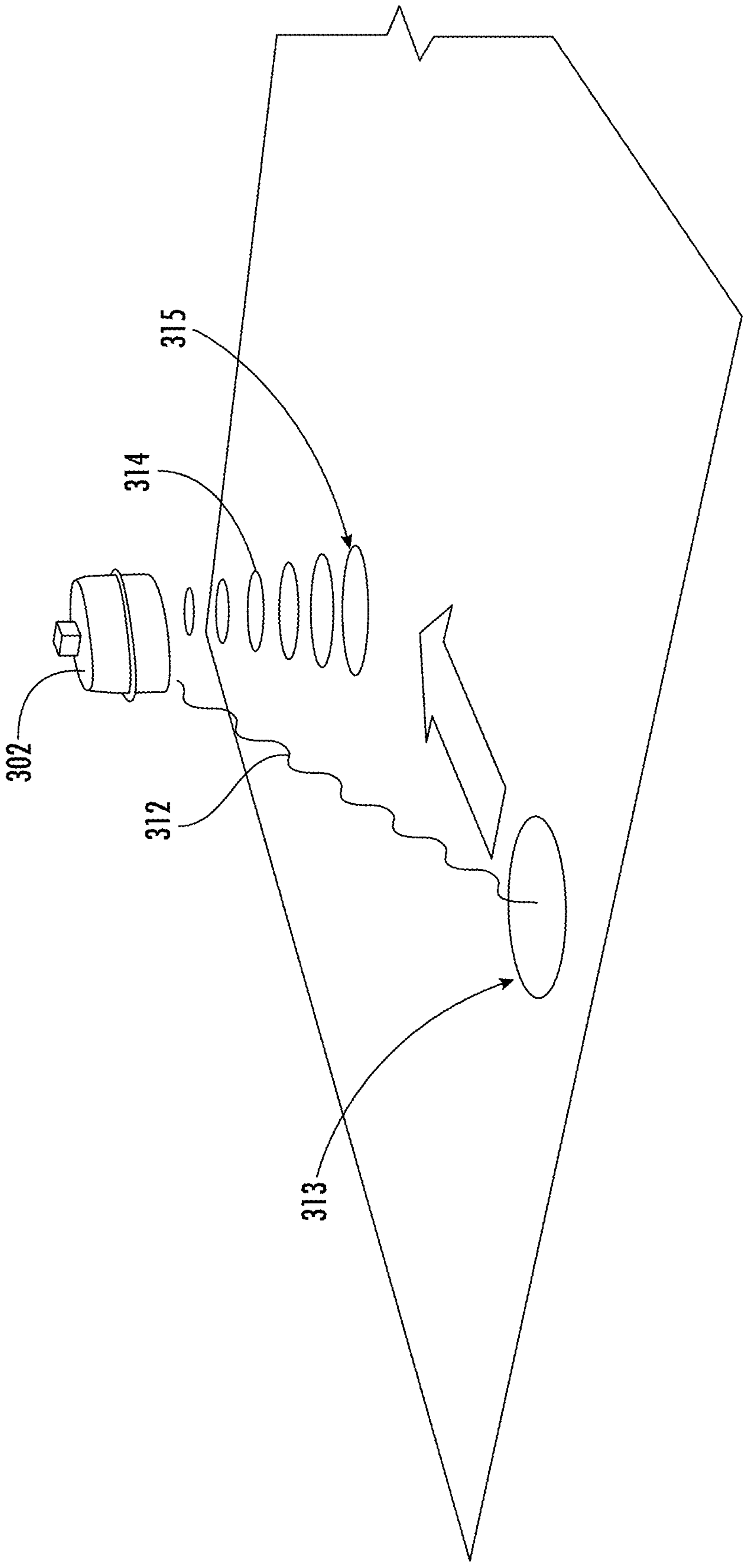
FIG. 3 is a schematic view illustrating another example monitor deployed in an open channel environment, in accordance with some embodiments herein.

While monitors disposed in non-pressurized pipe systems are illustrated in FIGS. 1 and 2A, the monitors may be provided in other environments. For example, FIG. 3 illustrates a schematic view of a monitor deployed in an open channel environment. The monitor 302 may operate similarly to the monitors 102, 202 described above. The monitor 302 may have a nadir-facing sensor with a nadir-facing sensor signal path 314 and a first coverage area 315, and the monitor 302 may have an angled sensor with an angled sensor signal path 312 and a second coverage area 313.

Figure 11A:
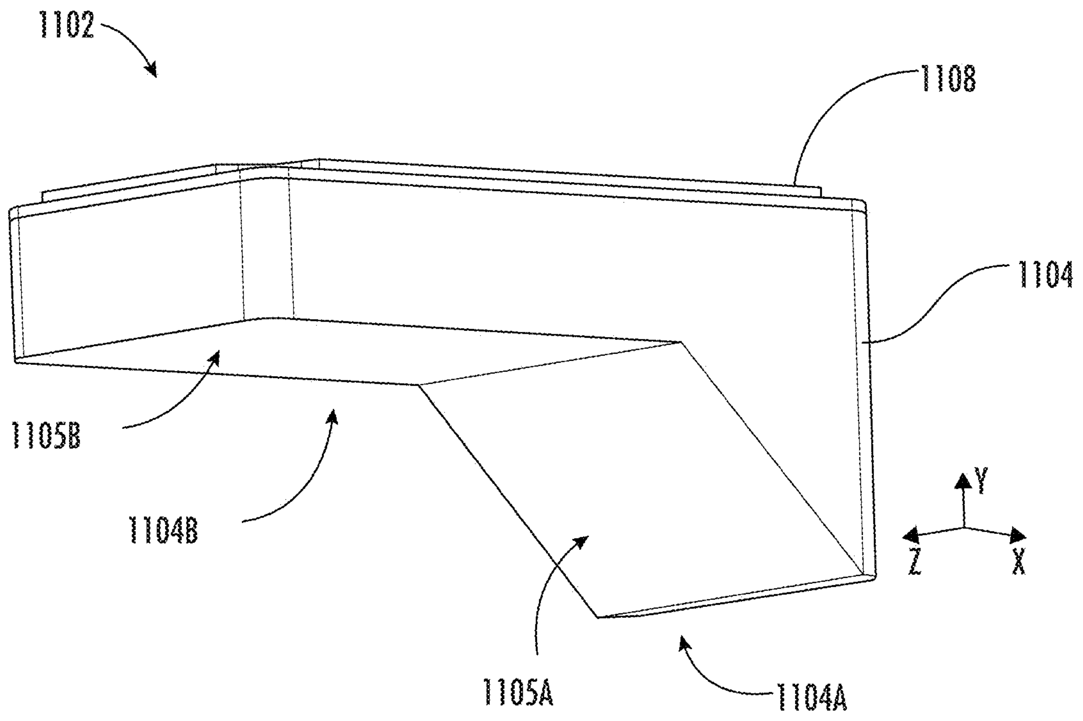
FIGS. 11A-11C are perspective views illustrating an example monitor having a sensor box, in accordance with some embodiments discussed herein.
Figure 11B:
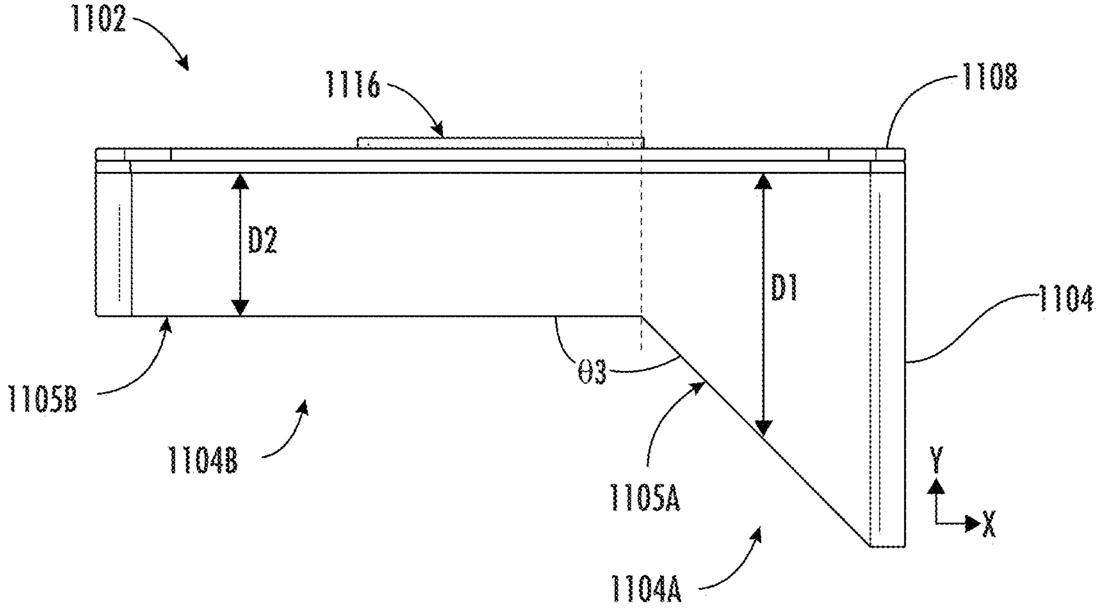
Figure 11C:
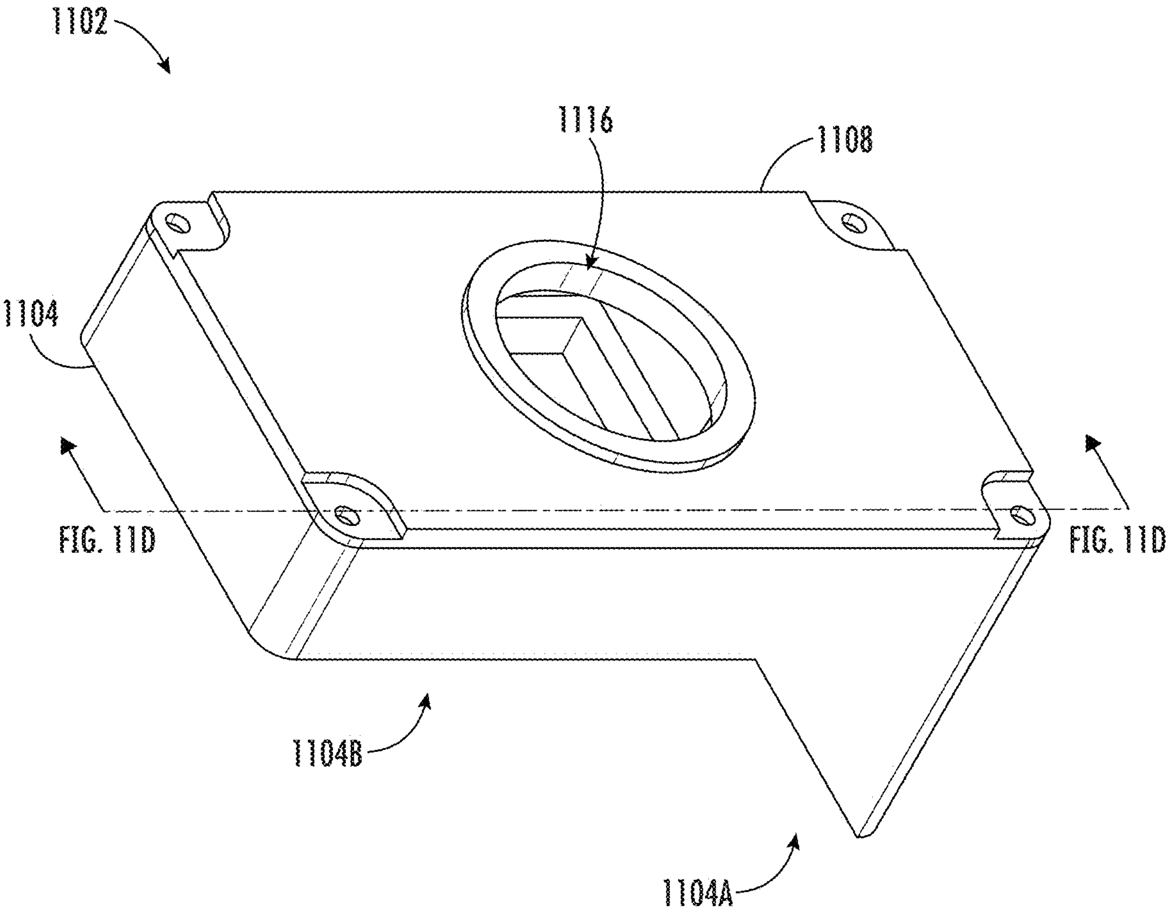

Looking ahead at FIGS. 11A-11C, an example sensor box 1104 of a monitor 1102 is illustrated. As illustrated in FIG. 11B, the X-axis extends right to left, and the Y-axis extends up and down. The Z-axis extends into and out of the page.

The sensor box 1104 comprises a first portion 1104A and a second portion 1104B. The first portion 1104A and the second portion 1104B are separated by the dashed line B in FIG. 11B. In FIG. 11B, the first portion 1104A is larger in cross-sectional size relative to the second portion 1104B in a plane that is parallel to the Y-Z plane. The first portion 1104A defines a first distance D1 in a line parallel to the Y-axis, the second portion 1104B defines a second distance D2 in a line parallel to the Y-axis, and the first distance D1 is greater than the second distance D2. Because the first wall 1105A of the first portion 1104A is sloped at an angle, the first distance D1 varies based on the position along the X-axis that it is measured. However, regardless of the position where the first distance D1 is measured, the first distance D1 is always larger than the second distance D2 of the second portion 1104B. Because the second wall 1105B extends in a plane that is parallel to the X-Z plane in FIG. 11B, the second distance D2 remains constant regardless of the position along the X-axis where the second distance D2 is measured.

Additionally, the first wall 1105A of the first portion 1104A is provided at an angle θ3 relative to the second wall 1105B of the second portion 1104B. The angle θ3 may possess a variety of values. For example, the angle θ3 may range from approximately 95 degrees to approximately 175 degrees, from approximately 110 degrees to approximately 160 degrees, or from approximately 120 degrees to approximately 150 degrees. In the illustrated embodiment, the angle θ3 is approximately 135 degrees, so the first wall 1105A extends at a 45 degree angle relative to the X-Z plane. By providing the first portion 1104A having an enlarged size, the angled sensor 1114 may be easily positioned within the first portion 1104A so that angled sensor 1114 is configured to emit radar signals at the desired angle (e.g., 45 degrees relative to the horizontal plane). The angled sensor 1114 may be provided in the form of a flow radar sensor in some embodiments, and the angled sensor 1114 may be similar to other angled sensors described herein.

The material provided at the first wall 1105A and the second wall 1105B is either transparent or semi-transparent at the locations where radar signals are emitted through the wall 1105A, 1105B to enable effective transmission of radar signals. In some embodiments, the entire first wall 1105A and the entire second wall 1105B comprises material that is either transparent or semi-transparent to enable effective transmission of radar signals.

A sensor box 1104 may receive a sensor container lid 1108 at the top of the sensor box 1104. The sensor container lid 1108 may provide an effective seal to prevent moisture, water, dust, and other substances from entering into the monitor 1102 in an opening between the sensor box 1104 and the sensor container lid 1108. The sensor container lid 1108 also comprises a lid opening 1116. The lid opening 1116 may be configured to receive wires 227 (see FIG. 2B) through the lid opening 1116, and this may enable the monitor 1102 to receive one or more power wires connected to a power source such as battery box 221 (see FIG. 2B), to receive one or more data wires to connect to data source, to receive one or more antenna wires to connect with an antenna 245 (see FIG. 2B), and to receive one or more other types of wires. The lid opening 1116 may also be configured to receive first rail section 224A (see FIG. 2B) or a retractable rail 224 (see FIG. 2A) to facilitate a connection of the monitor 1102 to the remainder of the system. In some embodiments, threads may be provided at the lid opening 1116 to facilitate a connection of the monitor 1102 to the remainder of the system, but fasteners such as screws or snap-fit connections may also be used to facilitate this connection of the monitor 1102.

Figure 11D:
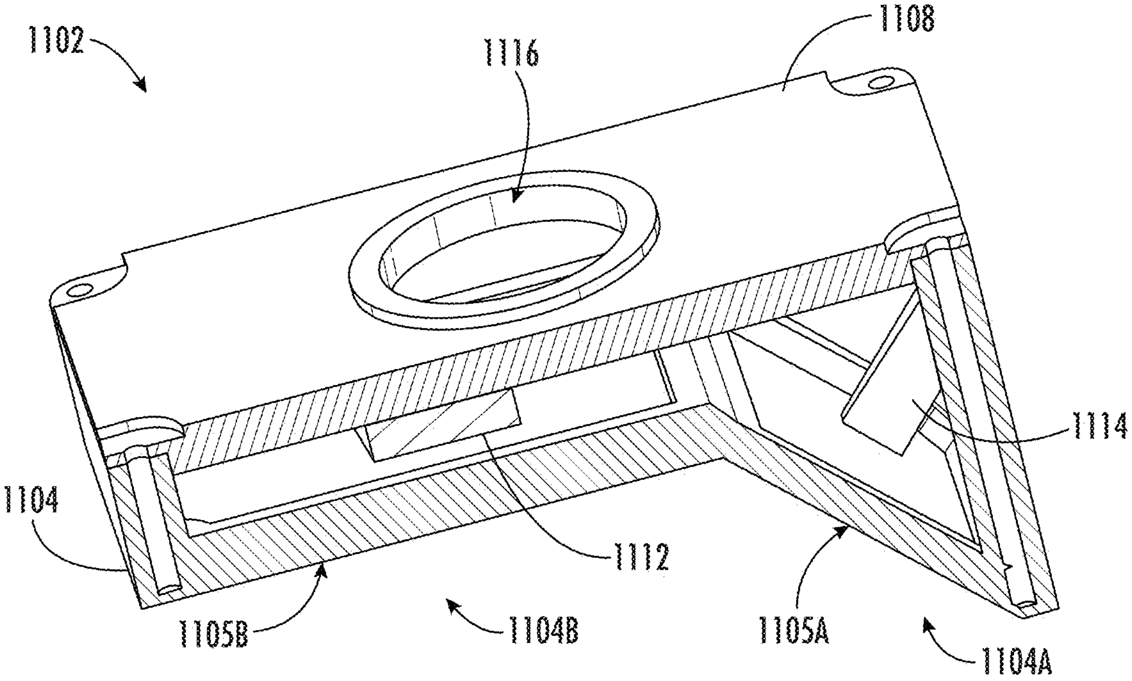
FIG. 11D is a cross-sectional view illustrating the sensor box of FIGS. 11A-11C, in accordance with some embodiments discussed herein.

Looking now at FIG. 11D, a cross-sectional view of the sensor box 1104 of FIGS. 11A-11C is illustrated. This cross-sectional view is taken about the cross-sectional line included in FIG. 11C. As illustrated in FIG. 11D, the nadir-facing sensor 1112 and an angled sensor 1114 are provided. The angled sensor 1114 may be positioned proximate to the first wall 1105A, and the angled sensor 1114 may be positioned in contact with the first wall 1105A in some embodiments. The angled sensor 1114 is positioned in the first portion 1104A of the sensor box 1104. A nadir-facing sensor 1112 may be positioned proximate to the second wall 1105B, and the nadir-facing sensor 1112 may be positioned in contact with the second wall 1105B in some embodiments. The nadir-facing sensor 1112 is positioned in the second portion 1104B of the sensor box 1104. The nadir-facing sensor 1112 may be provided in the form of a range radar sensor in some embodiments, and the nadir-facing sensor 1112 may be similar to other nadir-facing sensors described herein.

Figure 11E:
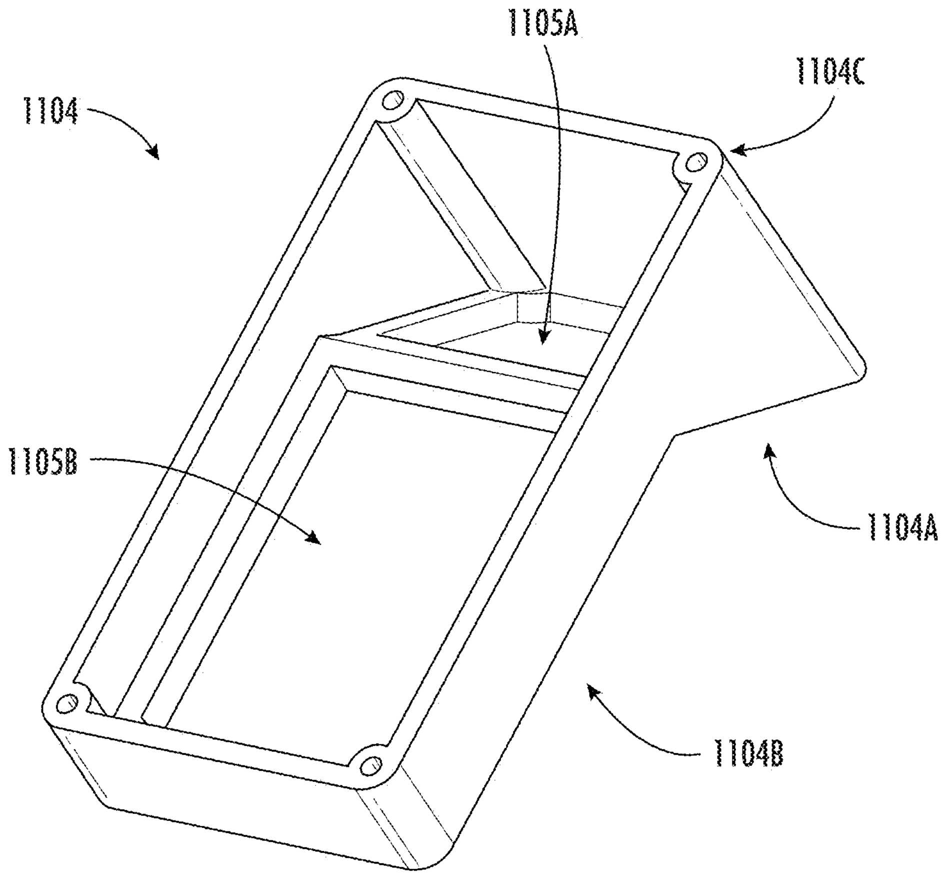
FIG. 11E is a perspective view of the sensor box within the monitor of FIG. 11A where the interior of the sensor box may be seen, in accordance with some embodiments discussed herein.

Turning now to FIG. 11E, a perspective view of the sensor box 1104 is illustrated where the interior of the sensor box 1104 may be seen. An angled sensor 1114 (see FIG. 11D) may be positioned proximate to the first wall 1105A, and the angled sensor 1114 may be positioned in contact with the first wall 1105A in some embodiments. A nadir-facing sensor 1112 (see FIG. 11D) may be positioned proximate to the second wall 1105B, and the nadir-facing sensor 1112 may be positioned in contact with the second wall 1105B in some embodiments. Also, holes 1104C are provided in the sensor box 1104 at each of the corners of the sensor box 1104, and the holes 1104C may facilitate the connection between the sensor box 1104 and the sensor container lid 1108 (see FIG. 11B). In some embodiments, the holes 1104C may be threaded holes that may be engaged by threaded screws. However, in some embodiments, holes 1104C may be omitted, and the sensor box 1104 and the sensor container lid 1108 may be attached together using another approach.

Figure 4:
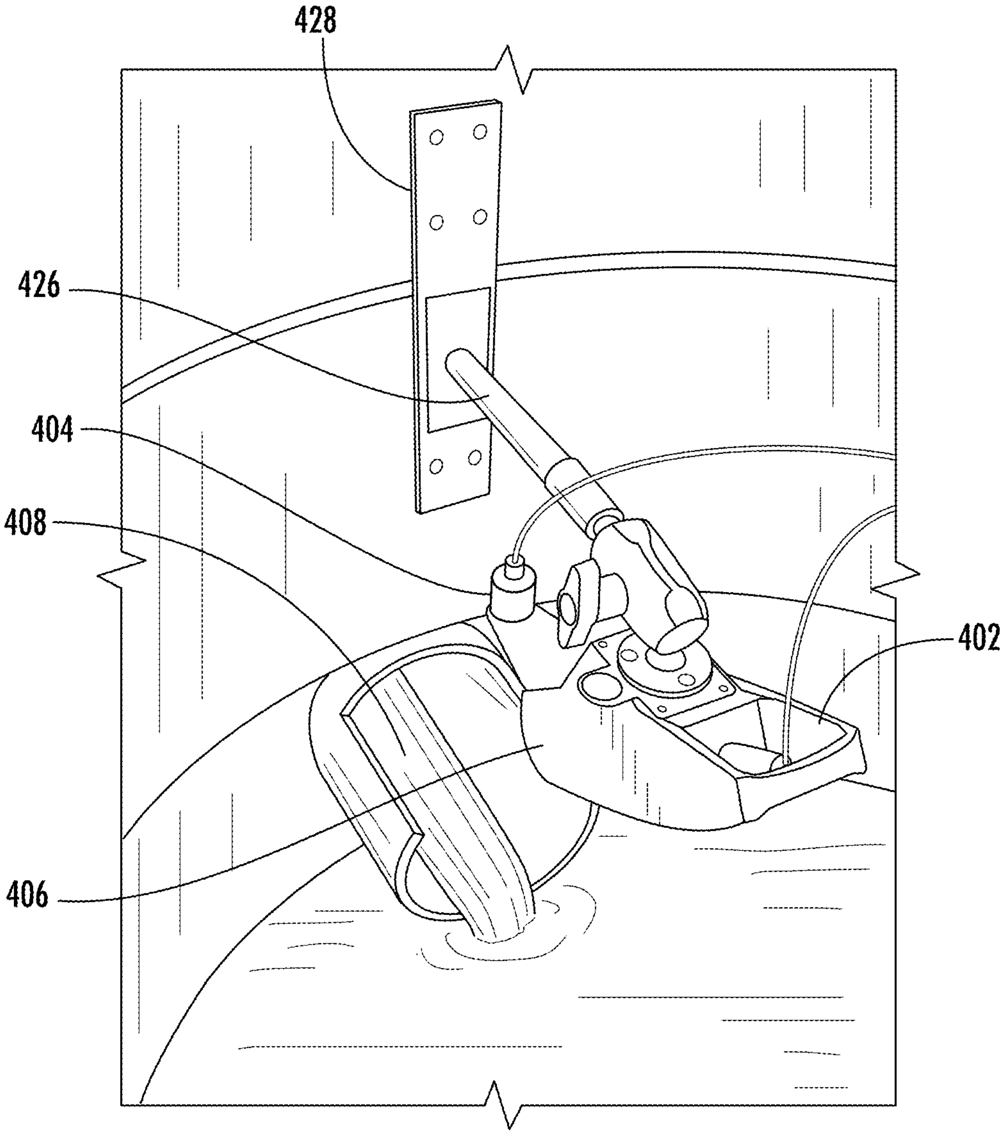
FIG. 4 is a perspective view illustrating an example monitor that is deployed in a non-pressurized pipe system, in accordance with some embodiments herein.

As another example, FIG. 4 illustrates a perspective view of an example monitor 402 that is deployed at an outlet of a pipe. Similar to the other monitors described above, the monitor 402 may include a nadir-facing sensor 404 and an angled sensor 406 to measure properties of a fluid 408. The monitor 402 may be secured to a rail 426 that is in turn secured to another structure on a wall.

Certain challenges arise with above-liquid radar flow monitors in sewer/stormwater systems. These monitors are frequently used in confined volumes having tight geometries. Where this is the case, the monitor often has to be lowered down to a location proximate to the fluid because radar signals are often transmitted angled sensors of from monitors at an angle of approximately forty-five (45) degrees. Placement of a monitor at lower elevations can be problematic because fluid levels may fluctuate—for example, during storms or in the event of blockages in the flow paths, the fluid levels may rise. If the fluid level rises to the level of the monitor, this may prevent the monitor from taking flow or level readings and may cause damages to the monitor and electrical components therein. The example embodiment of FIG. 4A helps to address these challenges.

Figure 4A:
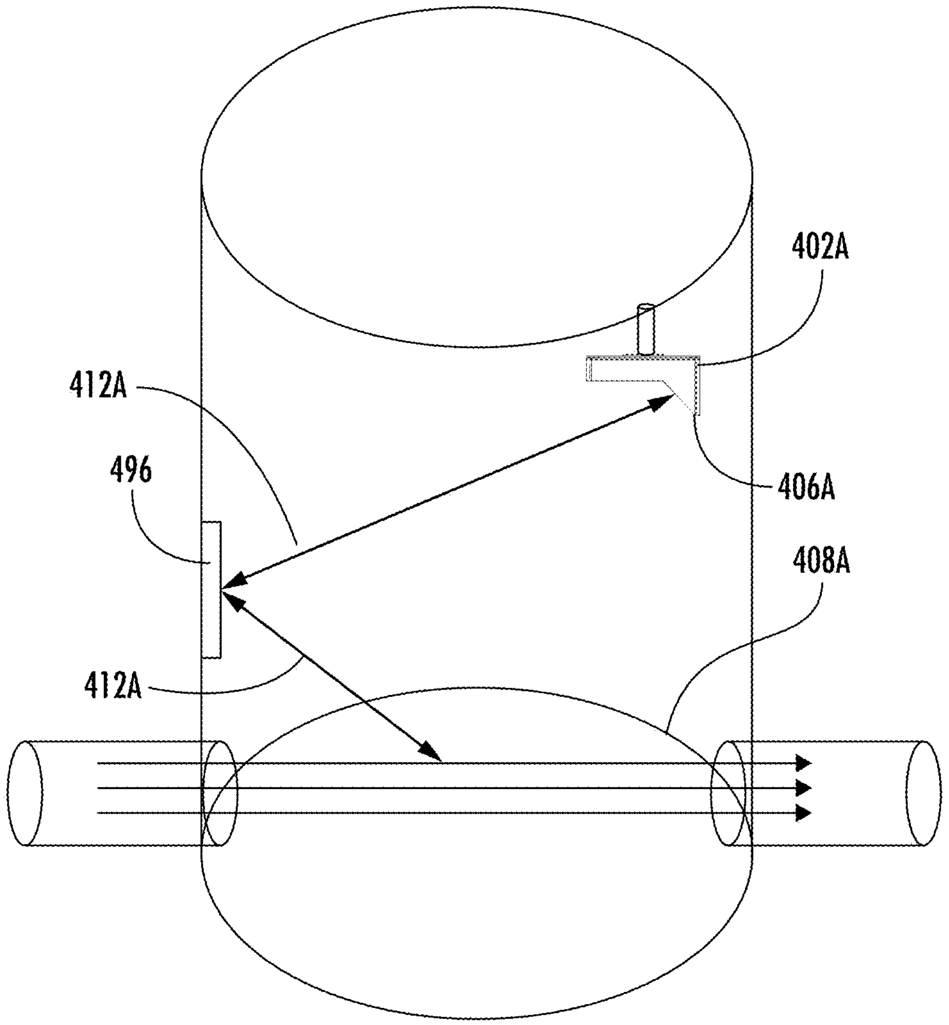
FIG. 4A is a schematic view illustrating an example monitor that is deployed so that it will be configured to reflect radar signals off of walls, in accordance with some embodiments herein.

FIG. 4A illustrates a schematic view of an example monitor 402A that is deployed so that it will be configured to reflect radar signals off of walls. The use of a monitor configured to reflect radar signals off of walls may permit the measurement of flow velocities from a much greater height. This may increase the reliability and operating life of the monitors. Further, this may reduce costs as monitors will not need to be replaced as often, and workers will be required to perform less maintenance on the monitors, reducing expenses. In the illustrated embodiment, the monitor 402A has an angled sensor 406A that is configured to transmit radar signals at an angle. This angle may be approximately forty-five (45) degrees in some embodiments. Radar signals may be transmitted along angled sensor signal paths 412A, and the angled sensor signal path 412A may be reflected off of a wall so that radar signal may reach the fluid 408A. The doppler signal from the radar signals may be reflected back to the monitor 402A. In the illustrated embodiment, a reflector 496 may be provided at certain locations on the wall. However, in other embodiments, the radar signals may be reflected off of the walls without a reflector 496. The reflector 496 may comprise metal in some embodiments, but other materials may be used at the reflector 496. Where a monitor is used that is configured to reflect radar signals off of walls, the power for transmission of the radar signals may be increased relative to the transmission power used for radar signals when radar signals are transmitted directly towards a fluid. The transmission power level of radar signals may be adjusted to a particular use case to ensure that the monitor will function appropriately. Additionally, in some embodiments, radar signals may be transmitted at a range of angles, and the radar signals may be steered across a number of possible angles (e.g. through frequency steering). The angle that radar signals are transmitted at and the angle that signals are received at may be varied may be varied using one or more antennas. In FIG. 4A, the fluid is travelling from right to left with a given velocity. However, the monitor may detect the properties of fluid where the fluid is travelling in another direction (e.g. from left to right or in some other direction).

Figure 4B:
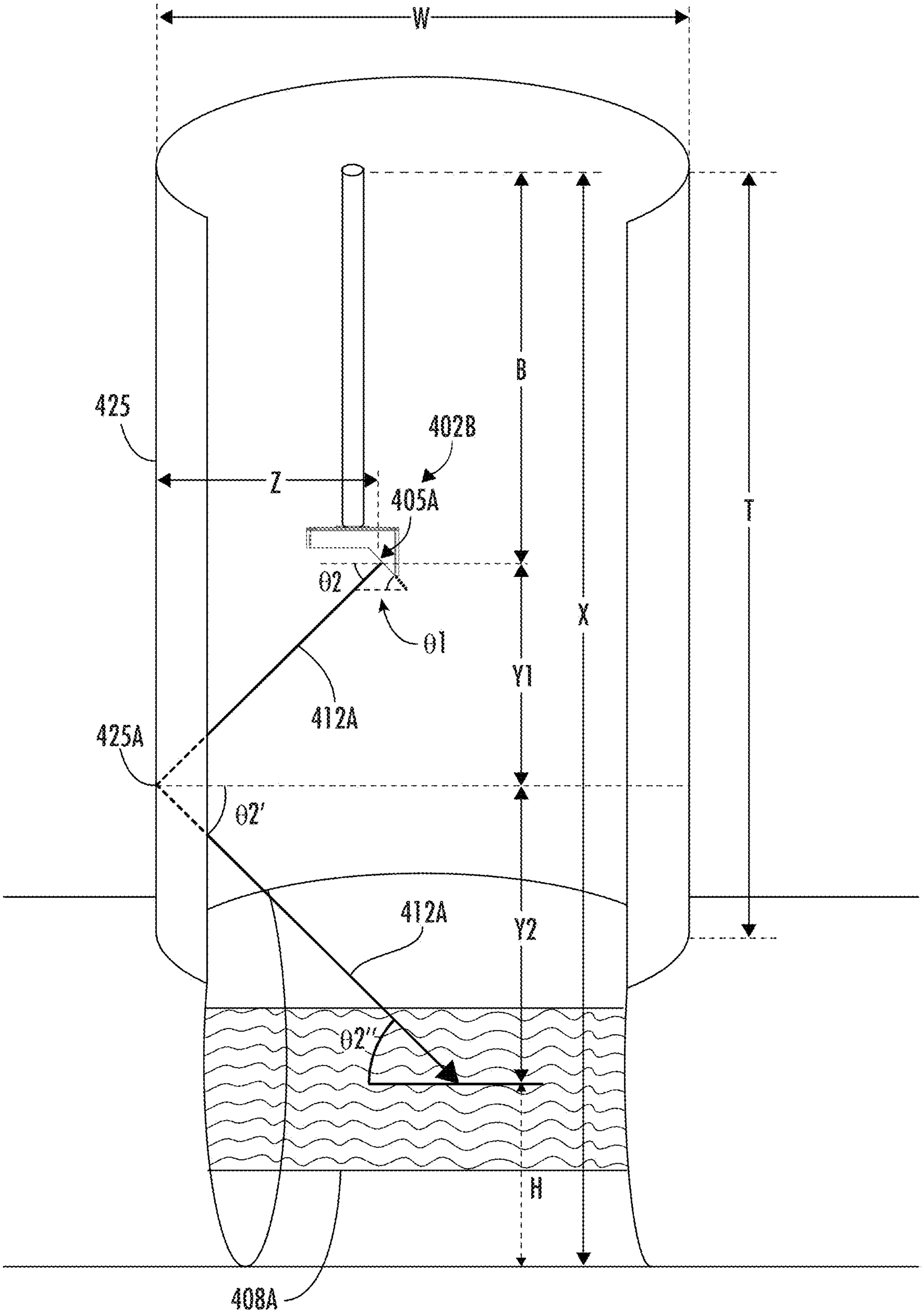
FIG. 4B is a schematic view illustrating an example monitor that is deployed so that it will be configured to reflect radar signals off of walls, in accordance with some embodiments herein.

Looking now at FIG. 4B, an example monitor 402B is shown that is deployed so that it will be configured to reflect radar signals off of the sewer walls 425, and various measurements related to the reflection of radar signals are shown. By configuring the monitor so that will reflect radar signals off of the sewer walls 425, the monitor 402B may be provided at higher elevations above the fluid 408A, which may reduce the risk of exposing the monitor 402B to the fluid 408A (e.g., in the event of flash floods, blockages in the sewer system, etc.).

In FIG. 4B, the sewer walls 425 define a width W, and this width W is the diameter of the sewer walls 425 in FIG. 4B. The monitor 402B extends downwardly a distance B from the top of the sewer. The fluid 408A has a fluid height H, and the fluid may be provided at a depth X below the top of the sewer. Where a brace 217 (see FIG. 2B) is utilized to connect the system to the sewer walls 425, the distance B may be the distance from the brace to the monitor 402B and the distance X may be the distance from the brace 217 to the fluid 408A. The horizontal distance from the monitor 402B to the wall where reflection occurs is defined by a horizontal distance Z, and this horizontal distance Z may be measured from the location where angled radar signals 412A are emitted at the monitor 402B. The height T is the distance from the top of the sewer walls 425 to the bottom of the sewer walls 425. The distance Y1 may be the vertical distance that the angled radar signals 412A travel before contacting a sewer wall 425 at a contact point 425A, and distance Y2 may be the vertical distance that the angle radar signals 412A travel between the contact point 425A and the fluid 408A. The distance Y1 may be determined using the equation below:

$$Y1 = \frac{Z}{\cos(\theta 1)} \cdot \sin(\theta 1) \quad [1]$$

Additionally, Y2 may be determined using the equation below:

$$Y2 = X - B - W - Y1 \quad [2]$$

The monitor may define a first wall 405A that is angled at an angle θ1 relative to the horizontal. The angle θ1 may possess a variety of values. In some embodiments, the angle θ1 may range from approximately 15 degrees to 75 degrees, from approximately 25 degrees to 65 degrees, or from approximately 35 degrees to approximately 55 degrees. In FIG. 4B, the angle θ1 is approximately 45 degrees.

In FIG. 4B, the angle radar signals 412A travel at a first downward angle θ2 relative to the horizontal. In some embodiments, the angle θ2 may range from approximately 15 degrees to 75 degrees, from approximately 25 degrees to 65 degrees, or from approximately 35 degrees to approximately 55 degrees. In FIG. 4B, the angle θ2 is approximately 45 degrees. In embodiments where the angled radar signals 412A are emitted in a direction normal to the first wall 405A, the angle θ2 may be calculated by the following equation:

$$\theta 2 = 90 - \theta 1 \quad [3]$$

As the angle radar signals 412A reflect off of the sewer wall 425 at the contact point 425A, the angle radar signals 412A travel at an angle θ2' relative to the horizontal. This angle θ2' is equal to the angle θ2 where the sewer wall 425 extends vertically at the contact point 425A as illustrated in FIG. 4B. The angle radar signals 412A are received at the surface of the fluid 408A at the angle θ2". This angle θ2" is equal to the angle θ2 and the angle θ2' where the sewer wall 425 extends vertically at the contact point 425A as illustrated in FIG. 4B and where the fluid 408A is substantially level in the horizontal plane.

Testing has been conducted to validate that the monitor may accurately predict the velocity of fluid when radar signals are reflected off of walls. In conducting testing, a metal plate was provided that was oriented vertically, and a monitor was provided so that it would transmit radar signals at an angle of forty-five (45) degrees. The monitor was oriented so that it would transmit radar signals at an angle towards the metal plate so that the radar signals would be reflected off of the metal plate and towards a fluid moving at a certain velocity. The monitor was tested in a controlled lab, and fluid moved in a controlled flume to allow for exact velocity control. In this way, the impact of extrinsic factors could be minimized. In testing, the monitor was used to measure the water velocity for five minute segments. The actual velocity was determined using an industrial sonar water velocity sensor, and the values obtained by the monitor using the radar signals that are reflected off of walls were then compared to actual velocity values. Testing was conducted multiple times to ensure that results were reproduceable.

Figure 4C:
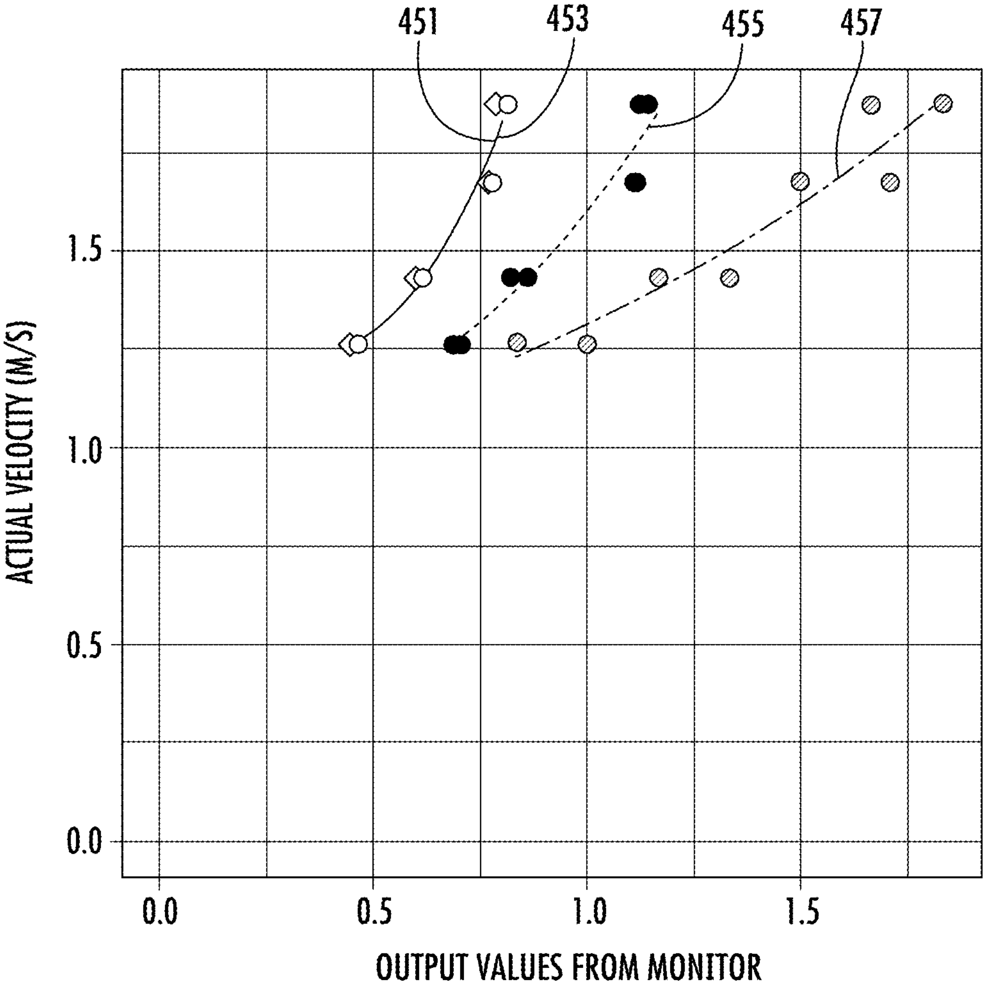
FIG. 4C is an example plot illustrating actual velocity values plotted against output values from a monitor configured to reflect radar signals off of walls, in accordance with some embodiments herein.

FIG. 4C illustrates an example plot illustrating results of testing, with actual velocity values plotted against output values from a monitor configured to reflect radar signals off of walls. The actual velocity values are provided on the Y-axis, and the output values from the monitor are provided on the X-axis. Various data points are plotted for mean values, 75th percentile mean values, maximum values, and median filter values. Furthermore, a line of best fit was plotted against each of the data points. Plotline 451 illustrates the line of best fit for the median filter value data points, line 453 illustrates the line of best fit for the mean value data points, line 455 illustrates the line of best fit for 75th percentile mean value data points, and line 457 illustrates the line of best fit for maximum value data points. For these values, the mean is the mean of all relevant values within a five-minute testing window. Additionally, the 75th percentile mean represents the mean of a twenty-five (25) percent chunk of the data that is greater than the rest of the set, and the 75th percentile mean may tend to provide more statistically significant results as it balances out extreme values. The maximum value is the maximum value of all values collected within a five-minute testing window. Also, the median filter value evaluated individual data points by their immediate neighbors, of which the median was taken. The median filter value may tend to provide more statistically significant results as it tends to balance out extreme values.

A statistical analysis of the relationship between the actual velocity values and the output values from the monitor show a strong relationship. Relevant statistics are provided in the table below:

| Predictors | R-squared | P-value |
|---|---|---|
| Mean | 92.57% | 0.0006495 |
| $75^{th}$ Percentile Mean | 90.51% | 0.0011970 |
| Maximum | 88.3% | 0.0020180 |
| Median Filter | 94.97% | 0.0002448 |

As illustrated, the relationship between the output values obtained by the monitor using reflected radar signals and the actual velocity values was strong during testing. For each of the different metrics, the p-value was less than 0.05, showing that a statistically significant relationship exists between the output values determined using the monitor and the actual velocity values. Furthermore, each of the R-squared values were greater than 88.3%, providing further validation that a strong relationship exists.

Monitors described herein may also possess increased accuracy as compared to alternatives, and the use of Multiple-Input Multiple-Output (MIMO) phase radar array may contribute to this increased accuracy. FIG. 5 illustrates a schematic view of transmitter units and receiver units within a MIMO phase radar array 529. In the illustrated embodiment, the array 529 includes two transmitter elements 530A, 530B (collectively referenced short-hand as 530), and the array 529 also includes four receiver elements 532A, 532B, 532C, 532D (collectively referenced short-hand as 532). While two transmitters 530 and four receivers 532 are illustrated in FIG. 5, it should be understood that any number of transmitters 530 and receivers 532 may be used. A multiplexer may be provided in processing circuitry 986 (see FIG. 9) or in the array 529, and this multiplexer may control the times at which signals are transmitted from transmitters 530. Additionally, one or more transceivers may be used, with the transceiver sending and receiving signals. By using such an array 529, nadir-facing sensors and angled sensors may generate data that can be used to generate an image of a fluid within a given environment. This may permit the surface roughness to be seen, and data regarding the velocity and level may also be provided. The array may also permit the pipe itself to be imaged to obtain information. Information may be obtained without requiring a user to set parameters, making deployment and installation easier. The array 529 may avow the system to create a three-dimensional image of a water surface having improved spatial resolution for multi-point surface velocity measurements and for environmental characterization.

Figure 5A:
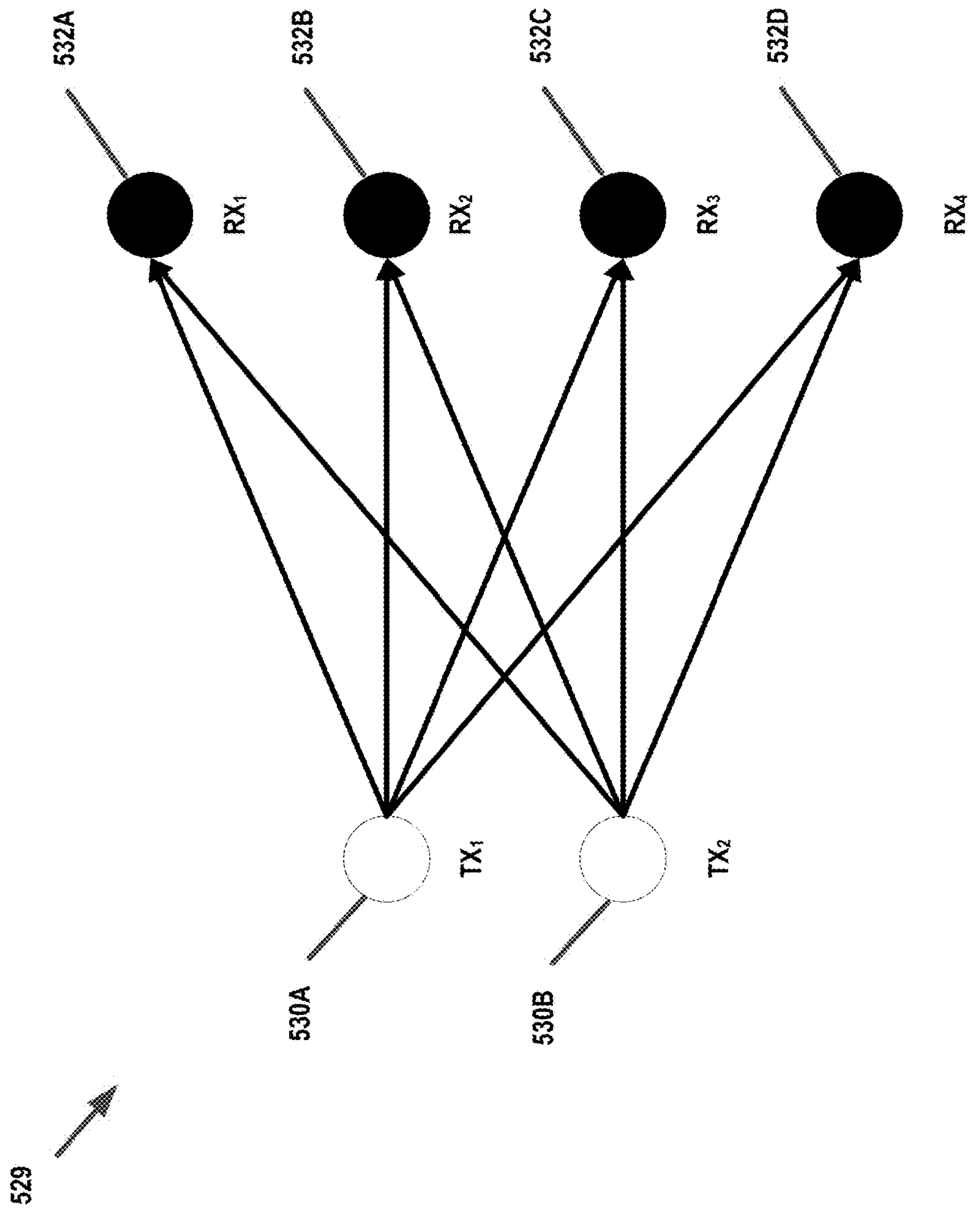
FIG. 5A is a schematic view illustrating transmitter units and receiver units within a Multiple-Input Multiple-Output (MIMO) phase radar, in accordance with some embodiments herein.
Figure 5B:
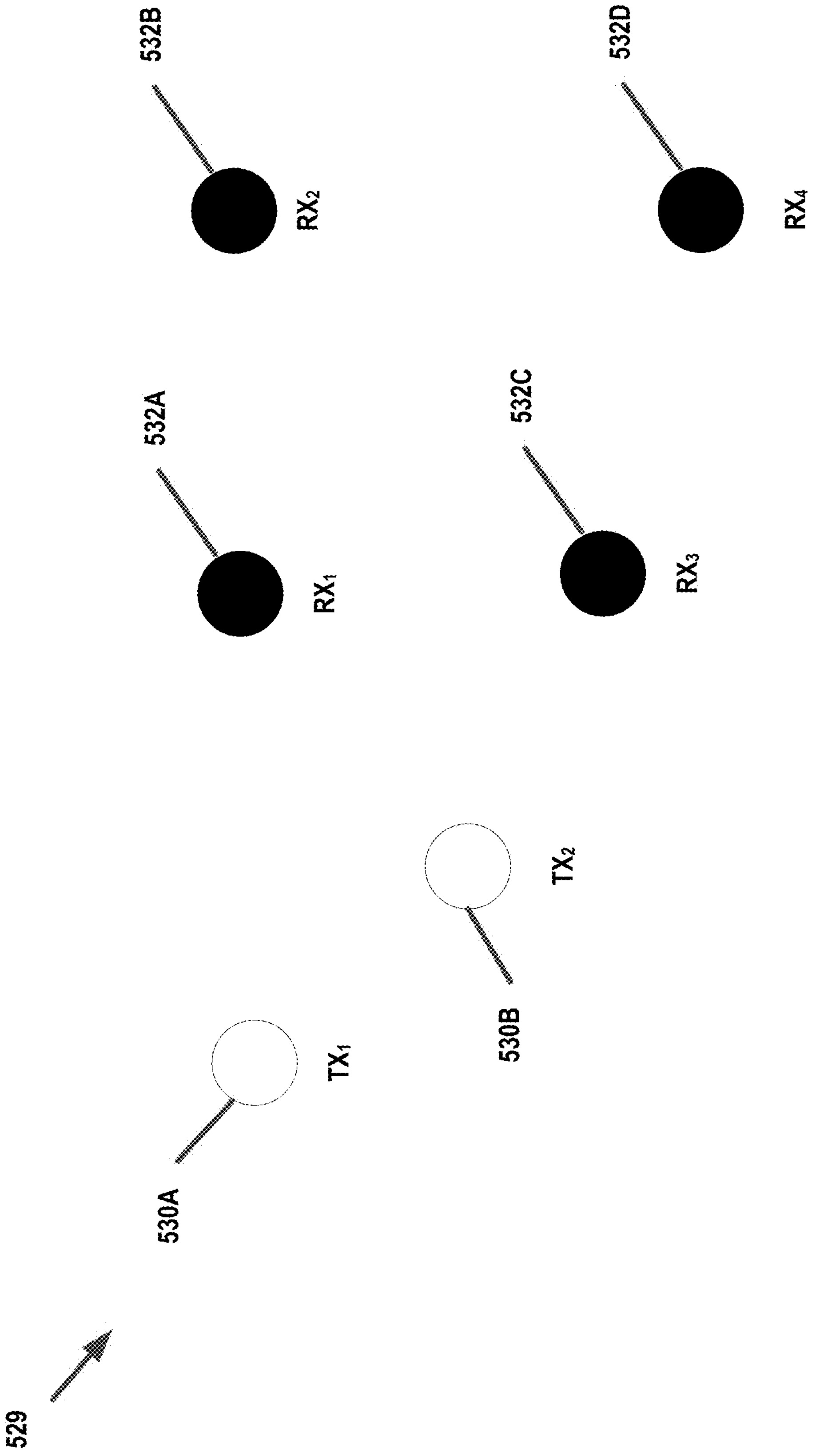
FIG. 5B is a schematic view illustrating transmitter units and receiver units with an alternative setup, in accordance with some embodiments herein.

The transmitters 530 and receivers 532 may be arranged in a wide variety of manners to optimize the calculations. For example, FIG. 5A illustrates the transmitters 530 presented in one line and receivers 532 presented in another line. However, other approaches may be used as well. For example, FIG. 5B illustrates a customized setup that may be used.

Figure 6:
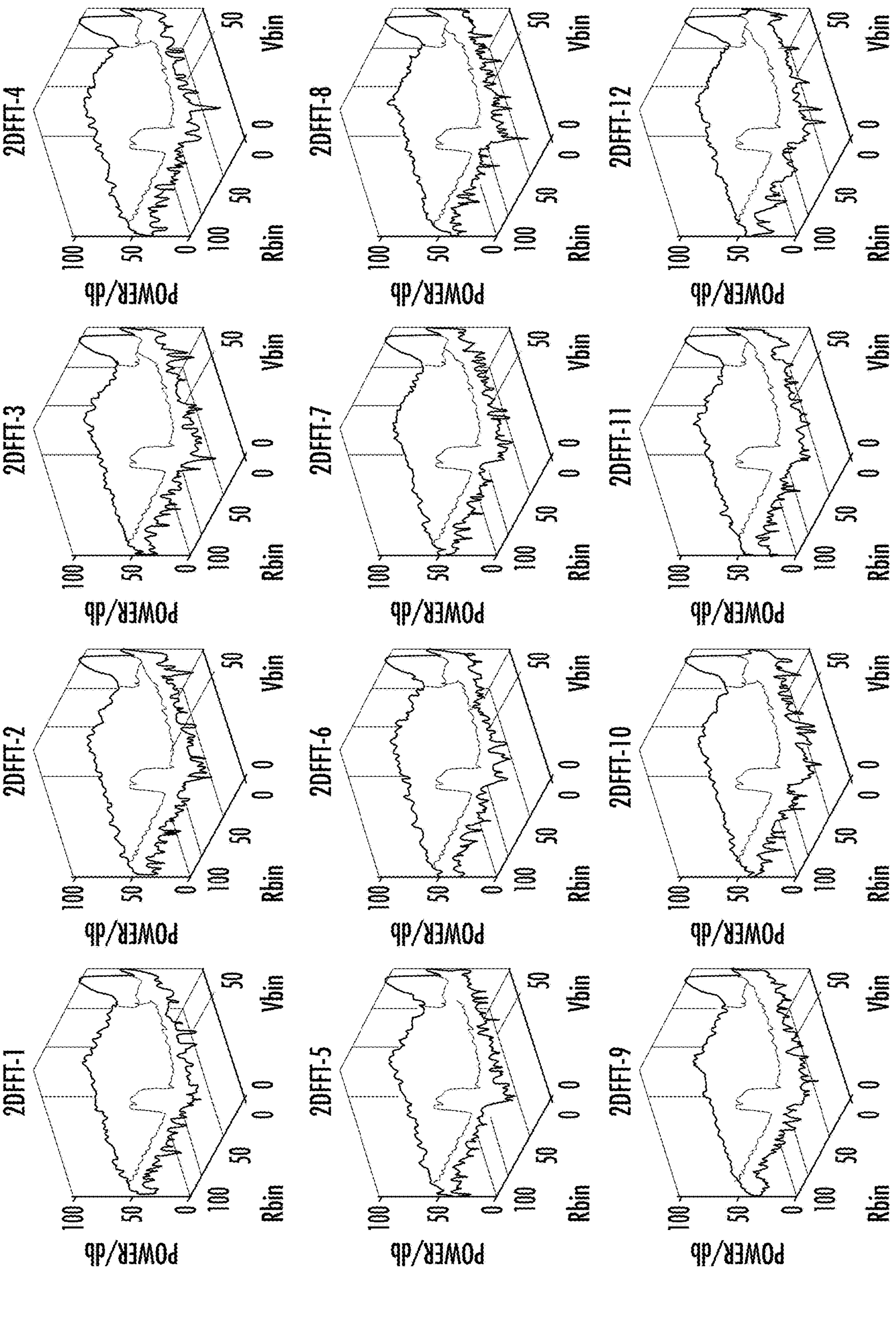
FIG. 6 illustrates sample data that may be generated by a two-dimensional (2D) FFT in a linear-frequency-modulated continuous-wave ("LFMCW") mode to calculate both level values and flow values through multiple antenna elements, in accordance with some embodiments herein.

Fast Fourier transforms may be performed on data received from a monitor as well as other data, and this may lead to the determination of higher-resolution flow and level measurements. Data may be processed using a 2D FFT and through the use of a Zoom FFT, which is a technique used to analyze data at a high resolution. FIG. 6 illustrates sample data that may be generated by a two-dimensional (2D) FFT in a linear-frequency-modulated continuous-waveform wavelength ("LFMCW") mode to calculate both level values and flow values.

Figure 7A:
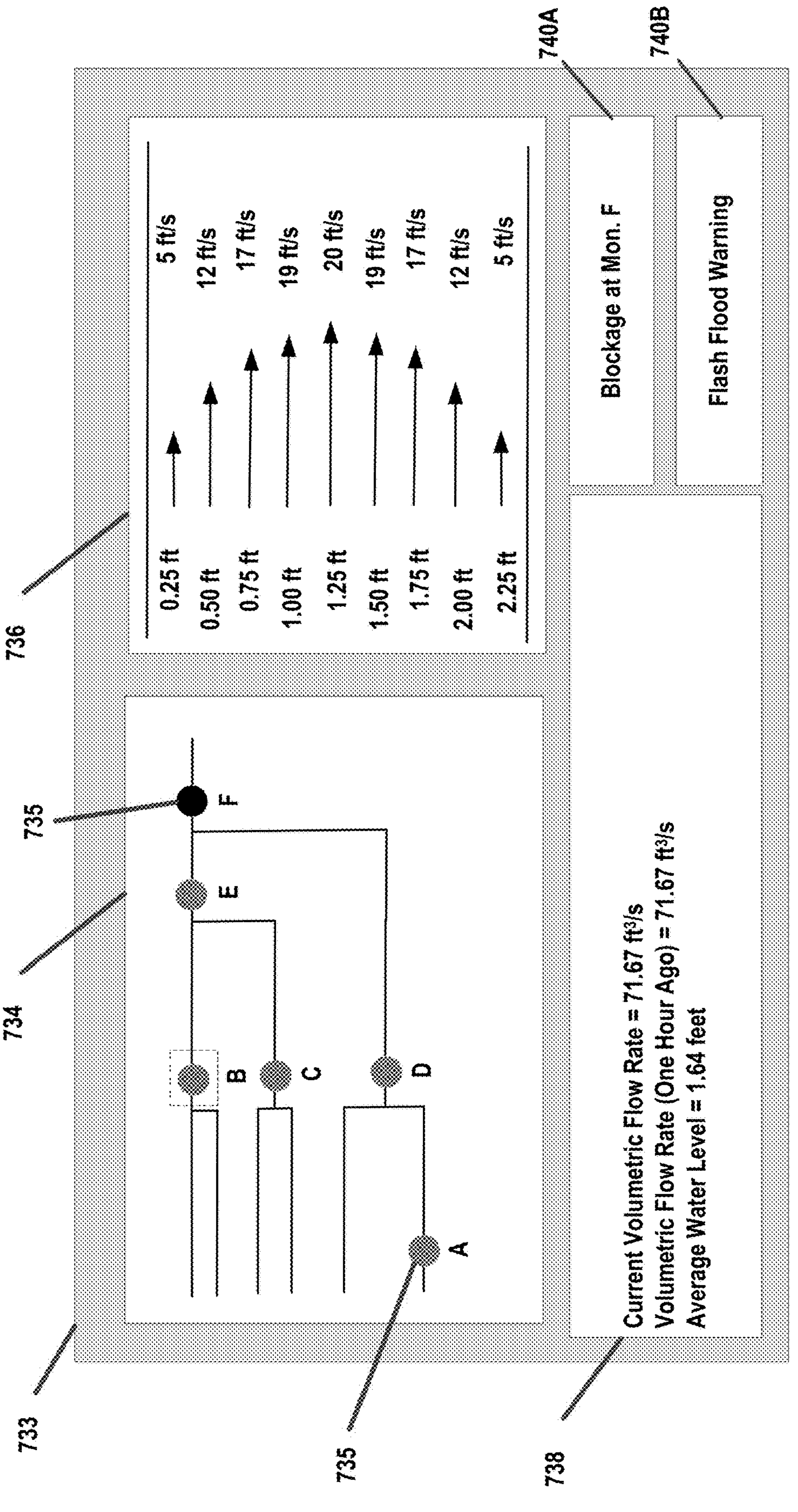
FIG. 7A is a schematic view illustrating an example display that may be presented to a user with information from the module, in accordance with some embodiments herein.

Data may be taken from the monitor, processed, and presented on a display at a remote location for convenient viewing by a user, and this display may provide an easily navigable interface that permits a user to quickly present her desired information. FIG. 7A illustrates an example display 733 that may be presented on a user device. This display 733 may present information from the monitor or information that was developed using information from the monitor. Various areas of the display 733 may present different types of information. In the illustrated embodiment, a first area 734 may present a map online dashboard. The monitors, systems, and methods provided herein may allow for more accurate monitoring of sewer blockage conditions. This map online dashboard may show a depiction of the piping systems and provide an overview of flow properties in the piping systems. The map online dashboard may also provide real-time flow properties including level and flow status. The system may intelligently identify locations and sections that have flood overflow conditions. Indicators 735 may indicate whether the flow properties are appropriate or whether they suggest that blockages or other issues are present. For example, the indicator 735 at monitor A may indicate that flow properties are appropriate, and an indicator 735 at monitor F may indicate issues with the flow properties.

The second area 736 may present information regarding the flow properties at a specific location within the piping system. For example, the illustrated embodiment is presenting information about the fluid properties detected at a cross-section of the pipe monitor B (see 734). A third area 738 may show data in a textual or numerical form.

One or more status alert screens may be provided. In the illustrated embodiment, a first status alert screen 740A and a second status alert screen 740B are provided. These screens may present information about blockages, irregular flow properties, flash flood warnings, environmental issues, etc. Information regarding weather, environmental, and other emergency issues may be received from a remote device or server such as a weather monitoring system.

Figure 7B:
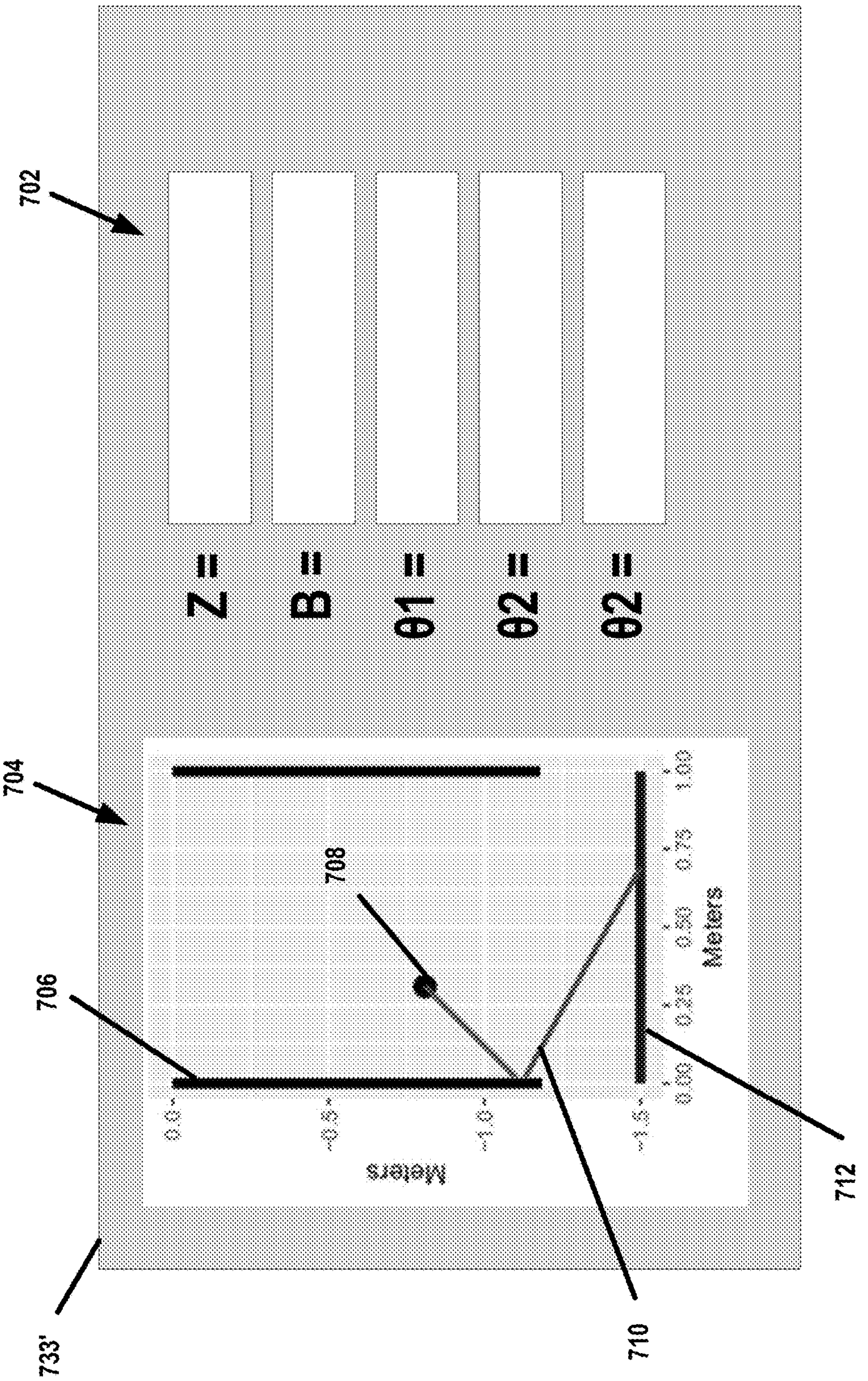
FIG. 7B is a schematic view illustrating an example display that may be presented to a user to enable the user to evaluate the signal path where signals reflect off of walls, in accordance with some embodiments herein.

Turning now to FIG. 7B, an example screen 733' is shown that may be presented to a user on a display to enable the user to evaluate the signal path where signals reflect off of walls. In the screen 733', various input fields 702 are provided where a user may input values for various measurements shown in FIG. 4B. For example, input fields 702 are provided for a distance Z representing the horizontal distance from the monitor to the wall where reflection occurs, a distance B representing the distance from the top of the sewer, a θ1 angle representing the angle of the first wall 405A, and a θ2 value representing the angle of travel for angled radar signals relative to the horizontal. Other input fields may be provided for other values such as the total distance from the monitor to the fluid, the height of the fluid, etc.

Based on values provided in input fields 702, processing circuitry 986 (see FIG. 9) may generate a graphical representation 704 and cause this graphical representation 704 to be presented on the screen 733' to enable the user to visualize the signal path for angled radar signals. The graphical representation 704 comprises a representation of a sewer wall 706, a representation of the module 708, a representation of the angled radar signal path 710, and a representation of the surface of the fluid 712. In the illustrated embodiment of FIG. 7B, the representation of the module 708 is a circle. However, in other embodiments, the representation of the module 708 may be presented in the shape of other modules illustrated in the figures.

The graphical representation 704 may be beneficial to allow the user to confirm that the angled radar signals are being directed towards the desired location. For example, the user may wish to have angled radar signals reflected so that they reach the fluid at a location that is directly below the monitor, and the user may adjust the values provided in the input fields 702 to accomplish this.

Additionally, in some embodiments, one of the input fields 702 may be the number of times that the user would like angled radar signals to reflect off of walls before reaching the fluid. For example, the user may indicate that the user would like for the angled radar signals to reflect off of walls zero times, one time, two times, or some other number of times. Based on this number and the other values provided by the user in the other input fields 702, the processing circuitry 986 (see FIG. 9) may be configured to determine a position for the monitor that will accomplish the largest distance between the monitor and the fluid. Once this position is determined, the processing circuitry 986 may generate a graphical representation where the monitor is provided at this position, and this graphical representation may be presented on the screen 733'. The user may then be permitted to make further adjustments to the position of the monitor after viewing the graphical representation.

Figure 8A:
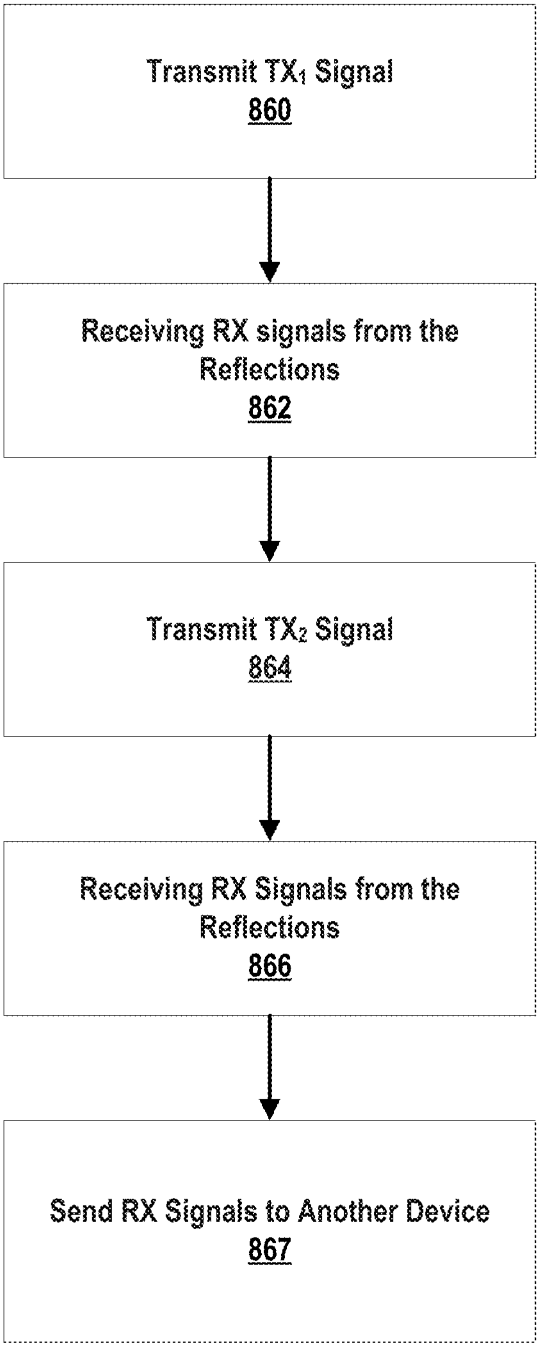
FIG. 8A is a flow chart illustrating an example method that may be performed to receive signals so that fluid properties may be calculated, in accordance with some embodiments herein.
Figure 8B:
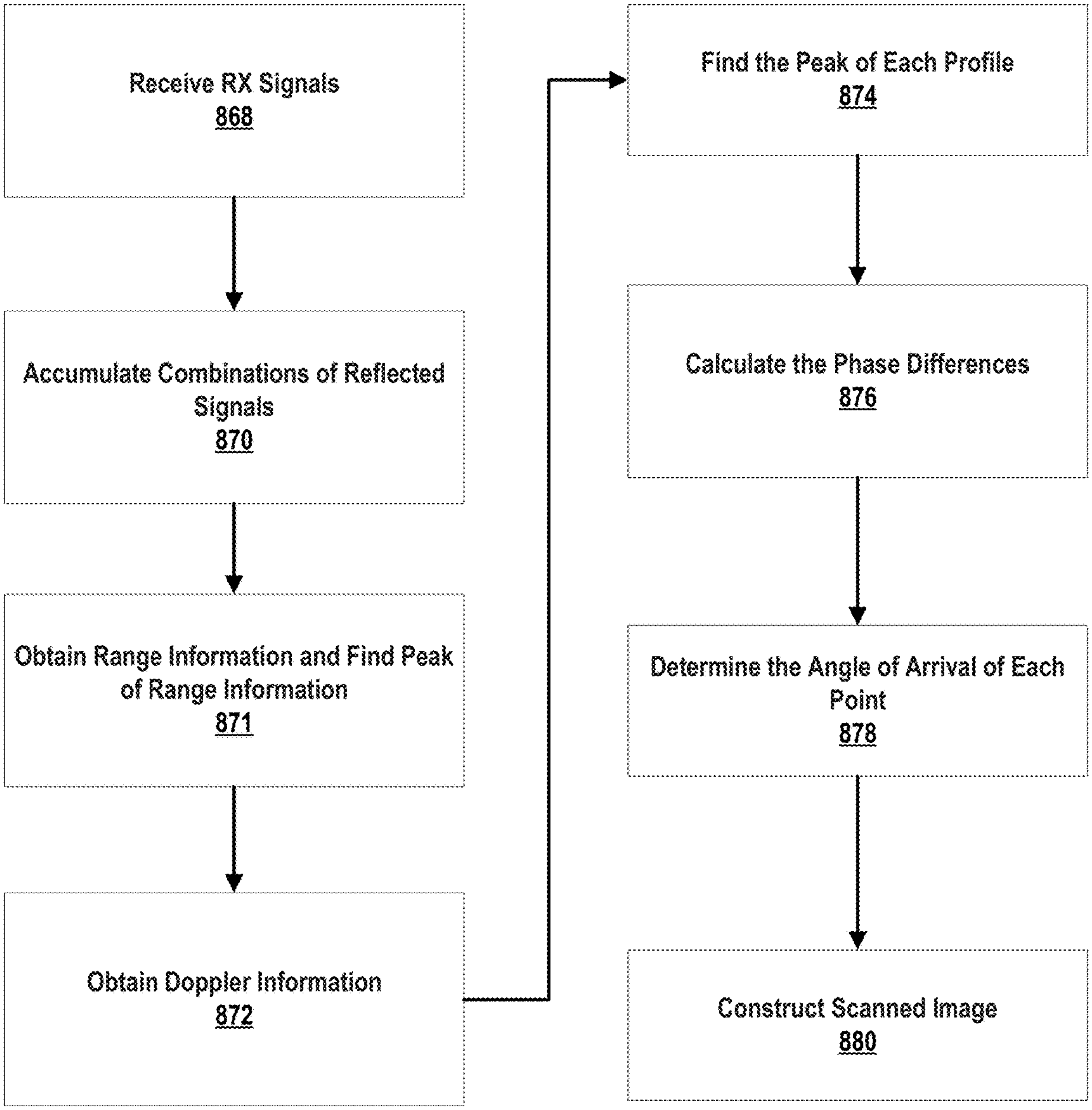
FIG. 8B is a flow chart illustrating an example method that may be performed to calculate fluid properties using the received signals, in accordance with some embodiments herein.

Various methods may be used to obtain improved information regarding the properties of a monitored fluid, and FIGS. 8A and 8B illustrates exemplary methods that may be employed. FIG. 8A is a flow chart illustrating an example method that may be performed to receive signals so that fluid properties such as flow rate, velocity, and fluid level may be calculated. FIG. 8B is a flow chart illustrating an example method that may be performed to calculate fluid properties such as flow rate, velocity, and fluid level using the receive signals. This method may be used to obtain a three dimensional representation of fluid flow and/or a map of surface velocities to more accurately estimate fluid flow. Notably, in some embodiments, FIG. 8A may be performed by a monitor and FIG. 8B may be performed by another device. However, in other embodiments, operation 867 and 868 may not be performed, and FIGS. 8A and 8B may be performed by the monitor and/or systems including the monitor.

Looking first at FIG. 8A, a transmit signal $TX_1$ is transmitted at operation 860. These signals may be transmitted towards the fluid, and the signals may be reflected off of the fluid. At operation 862, receive signals ($RX_1$, $RX_2$ . . . $RX_N$) may be received back from the reflections. For the angled sensor to function properly, the fluid that is being measured may be required to have small waves or ripples. In some embodiments, the height of these ripples must be 0.125 inches or greater. However, the required height may be smaller in other embodiments, especially where higher frequency signals are used.

At operation 864, a transmit signal $TX_2$ is transmitted. These signals may be transmitted towards the fluid, and the signals may be reflected off of the fluid. At operation 866, receive signals ($RX_1$, $RX_2$ . . . $RX_N$) may be received back from the reflections. While only two transmit signals are transmitted in the example method depicted in FIG. 8, additional transmit signals may be transmitted. Additionally, only one transmit signal may be used in some embodiments.

At operation 867, receive signals may be sent to another device. These signals may be sent through a network, through a wireless connection, or through a wired connection. However, in some embodiments, operation 867 may not be performed and the methods illustrated in FIGS. 8A and 8B may be performed by the monitor.

Looking now at FIG. 8B, the receive signals may be received by a device in operation 868. At operation 870, the various combinations of reflected signals may be accumulated (e.g. $TX_1$ received at $RX_1$, $TX_1$ received at $RX_2$, etc.). This may be done via a one-dimensional FFT. At operation 871, range information may be obtained, and the peak of the range information may be determined. At operation 872, Doppler information may be obtained. This may be done by conducting a second FFT of multiple frames of data. At operation 874, the peak of each profile may be identified, and, at operation 876, the phase differences between the various combinations may be calculated. At operation 878, the angle of arrival may be determined for signals of the combinations. At operation 880, a scanned image may be constructed. This scanned image may be a three dimensional scanned image, and the scanned image may provide an image of the fluid, the surrounding environment, the pipe, blockage material, and/or other factors.

It should be understood that the operations of the methods described above may be performed in any order unless specified otherwise, and some operations may be performed simultaneously. Additionally, operations may be added, and certain operations may be omitted without departing from the scope of the invention. For example, additional transmit signals may be transmitted, or only one transmit signal may be transmitted.

Various components may be provided within the monitor, and the monitor may be connected with other devices. FIG. 9 illustrates a block diagram illustrating various components of an exemplary system. A monitor 902 is illustrated in the upper portion of the figure, and this monitor 902 may have processing circuitry 986. The processing circuitry 986 may include one or more processors, microprocessors, controllers, microcontrollers, or other computing elements.

The monitor 902 may also have a MIMO phase radar array 929. This array 929 may be similar to the array 529 illustrated in FIG. 5 and described above. The array 929 may have different numbers of transmitters 930, ranging from a first transmitter 930A to a final transmitter 930N. Additionally, the array may have different numbers of receivers 932, ranging from a first receiver 932A to a final receiver 932N. The processing circuitry 986 may be connected to the individual transmitters 930 and receivers 932 directly, or the processing circuitry 986 may be connected to these elements indirectly.

Other sensors may be provided in a monitor 902 or alongside a monitor 902. A nadir-facing sensor 904, an angled sensor 906, and an IMU sensor 984 may each be provided, and these sensors may operate similar to the nadir-facing sensors, the angled sensors, and IMU sensors discussed above. An absolute orientation sensor 995 may be provided having an accelerometer 995A, a magnetometer 995B, and a gyroscope 995C. These sensors may each be connected, directly or indirectly, to the processing circuitry 986 so that data from the sensors may be utilized.

A communications interface 988 is also provided, and the communications interface 988 may be connected to processing circuitry 986. In some embodiments, the communications interface 988 may be configured to interact with other devices via a physical connection such as an ethernet connection. However, the communications interface 988 may also be configured to communicate wirelessly through a short-range wireless technology such as Bluetooth or Bluetooth Low Energy, wireless LAN, Wi-Fi, etc. The communications interface 988 may also be configured to communicate through Internet of Things ("IoT") cellular networks. For example, communications may be made through Category M1 ("Cat M1") technologies or a Narrow Band ("NB-IoT") technologies. Satellite communication and other low-power wide-area networks (LPWAN) such as a LoRaWAN network, SigFox, etc. may be used. The communications interface 988 may have an antenna and a transmitter, receiver, or transceiver in some embodiments.

In the illustrated embodiment, the communications interface 988 may form a connection, directly or indirectly, with a network 990. The connection to the network 990 may permit information to be sent from the monitor 902 to devices connected to the network and vice versa. In the illustrated embodiment, a user device 931 is illustrated, and this user device 931 may include a display 933. This display 933 may be similar to the display 733 illustrated in FIG. 7, but other displays may also be used. The user device 931 may come in a variety of forms. For example, the user device 931 may be a desktop computer, a laptop, a tablet, a cellular phone, etc. The user device 931 may also include a communications interface. In some embodiments, machine to machine cellular networks, satellite networks, or other low-power wide-area networks (LPWAN) may be used to transmit data in nearly real-time. A cellular phone may be used, for example, where important status conditions exist such as a flashflood, abnormal flow properties, or a blockage. Where these important status conditions arise, an automated call, text, or message may be sent to the cellular phone, or a notification may be provided from an application on the cellular phone.

In some embodiments, a second device 992 is provided. This second device 992 may take a variety of forms. For example, the second device 992 may be a server, a desktop computer, a laptop, a tablet, a smartphone, etc. In some embodiments, the second device 992 may be a network digital twin having a datalogger. This second device 992 may include a memory 994 where certain data and other information may be stored. The second device 992 may also include a communications interface. In alternative systems, data from a monitor is typically stored in a datalogger at the monitor itself, increasing the size and weight of the device. By storing data in this memory 994 at a second device 992, the size and overall mass of the monitor 902 may be reduced. Thus, the monitor 902 may be easier to use and to install.

Additionally, calculations may be performed at the monitor 902, at the user device 931, at the second device 992, or at another device connected to the network 990. In many embodiments, calculations may be performed at a separate server connected to the network. Where calculations are performed at a location other than the monitor 902 itself, this may reduce the cost of monitors as the processing circuitry therein would not be required to have a high processing power. Further, a server may be better equipped to perform complex calculations, and a server could perform such calculations for a plurality of monitors.

In some embodiments, the second device 992 or another device may be a weather monitoring system, and this weather monitoring system may provide flash flood warnings or warnings related to other relevant weather issues.

The connections between various components within FIG. 9 may take a variety of forms. For example, a physical connection or a wireless connection may be made, or devices may be connected via a network. While various connections are shown, these connections may be different in other embodiments. For example, additional connections may be provided that are not illustrated or connections that are shown may be omitted in certain embodiments.

Figure 10:
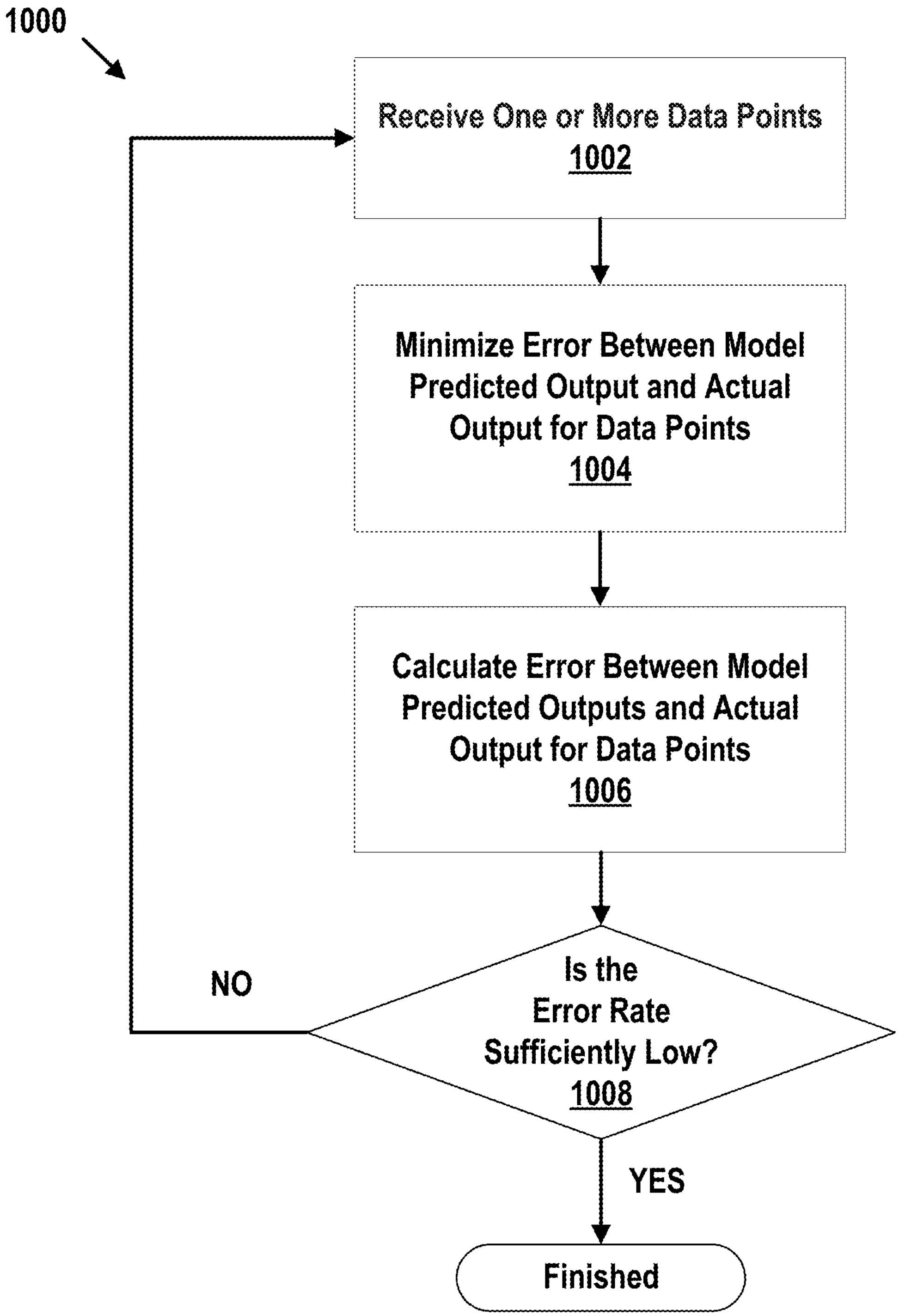
FIG. 10 is a flowchart illustrating an example method of machine learning, in accordance with some embodiments discussed herein.

The system may intelligently identify locations and section that have flood overflow conditions and also determine flow properties. FIG. 10 is a flowchart of an example method 1000 of machine learning, such as may be utilized with artificial intelligence for various embodiments of the present invention. Processing circuitry may be configured to develop a model for the determination of overflow locations or locations where blockage may be present. The developed model may be deployed and utilized to identify these locations so that they may be investigated quickly.

This system may beneficially utilize data from the IMU sensor, the angled sensor, and the nadir-facing sensor, and additional data may also be used. This data may be used to develop a model, and the developed model may assign different weights to different types of data that are provided. In some systems, even after the model is deployed, the systems may beneficially improve the developed model by analyzing further data points. By utilizing artificial intelligence, accurate information may be provided about the overflow/blockage locations, and information about these objects may be shared with an operator (such as on a display) so that the operator may make well-informed decisions. Utilization of the model may prevent the need for a user to spend a significant amount of time reviewing data and other information, freeing the user to perform other tasks and enabling performance and consideration of complex estimations and computations that the user could not otherwise solve on their own (e.g., the systems described herein may also be beneficial for even the most experienced users). The model may also reduce the response time to address overflow and blockage issues.

By receiving several different types of data, the example method 1000 may be performed to generate complex models. The example method 1000 may find relationships between different types of data that may not have been anticipated. By detecting relationships between different types of data, the method 1000 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed. The example method 1000 may also refine the deployed model to fine-tune weights that are provided to various types of data based on subtle changes to the monitor or the environment. Where certain parts of the monitor or system are replaced, modified, or damaged, or where there are swift changes in the environment, the method 1000 may continuously refine a deployed model to quickly account for the changes and provide a revised model that is accurate. By contrast, where a model is not continuously refined, changes to the model or the surrounding environment may make the model inaccurate until a new model may be developed and implemented, and implementation of a new model may be very costly, time-consuming, and less accurate than a continuously refined model.

At operation 1002, one or more data points are received. These data points may or may not be the initial data points being received. These data points may include fluid speed data, velocity data, direction data, level data, or roughness data. However, other types of data may be used. The data points provided at operation 1002 will preferably be historical data points with verified values to ensure that the model generated will be accurate. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, a model may be formed based on received data from a monitor and additional data.

For example, a model may be formed based on historical comparisons of overflow and/or blockage areas with other historical data (e.g. velocity, speed, level, pressure, etc.), and processing circuitry may be configured to utilize the developed model to determine when and where overflows and/or blockages are present. This model may be developed through machine learning utilizing artificial intelligence. Processing circuitry may be configured to use the model and input the data received form the monitor with the model to determine if an overflow or blockage is present. If present, a precise location may be provided. The development of such a model may permit an accurate prediction of the overflow or blockage location, and this may prevent the need for monitors to detect conditions throughout the entire fluid environment.

At operation 1004, a model is improved by minimizing error between a predicted overflow/blockage characteristic generated by the model and an actual overflow/blockage characteristic. In some embodiments, an initial model may be provided or selected by a user. The user may provide a hypothesis for an initial model, and the method 1000 may improve the initial model. However, in other embodiments, the user may not provide an initial model, and the method 1000 may develop the initial model at operation 1004, such as during the first iteration of the method 1000. The process of minimizing error may be similar to a linear regression analysis on a larger scale where three or more different variables are being analyzed, and various weights may be provided for the variables to develop a model with the highest accuracy possible. Where a certain variable has a high correlation with an overflow/blockage characteristic, that variable may be given increased weight in the model. In refining the model by minimizing the error between the predicted overflow/blockage characteristic generated by the model and the actual or known overflow/blockage characteristic, the component performing the method 1000 may perform a very large number of complex computations. Sufficient refinement results in an accurate model.

In some embodiments, the accuracy of the model may be checked. For example, at operation 1006, the accuracy of the model is determined. This may be done by calculating the error between the model predicted overflow/blockage characteristic generated by the model and the actual overflow/blockage characteristic from the data points. In some embodiments, error may also be calculated before operation 1004. By calculating the accuracy or the error, the method 1000 may determine if the model needs to be refined further or if the model is ready to be deployed. Where the overflow/blockage characteristic is a qualitative value or a categorical value (e.g. a determination of whether a blockage is present), the accuracy may be assessed based on the number of times the predicted value was correct. Where the overflow/blockage characteristic is a quantitative value, the accuracy may be assessed based on the difference between the actual value and the predicted value.

At operation 1008, a determination is made as to whether the calculated error is sufficiently low. A specific threshold value may be provided in some embodiments. For example, where the overflow/blockage characteristic is a location, the threshold may be 5 feet, and the calculated error may be sufficiently low if the average error is less than or equal to 5 feet. However, other threshold values may be used, and the threshold value may be altered by the user in some embodiments. If the error rate is not sufficiently low, then the method 1000 may proceed back to operation 1002 so that one or more additional data points may be received. Once the error rate is sufficiently low, the training phase for developing the model may be completed, and the implementation phase may begin where the model may be used to predict expected overflow/blockage characteristics. In some embodiments, the model may be modified (e.g., further refined) based on the received data points.

By completing operations 1002, 1004, 1006, and 1008, a model may be refined through machine learning utilizing artificial intelligence based on the historical comparisons of flow data and blockage data and based on known deviations of the overflow/blockage data for the historical comparisons. Notably, example model generation and/or refinement may be accomplished even if the order of these operations is changed, if some operations are removed, or if other operations are added. While the method 1000 described above is directed to developing models to predict overflow and/or blockage conditions, models may be produced to predict other parameters as well.

Figure 12:
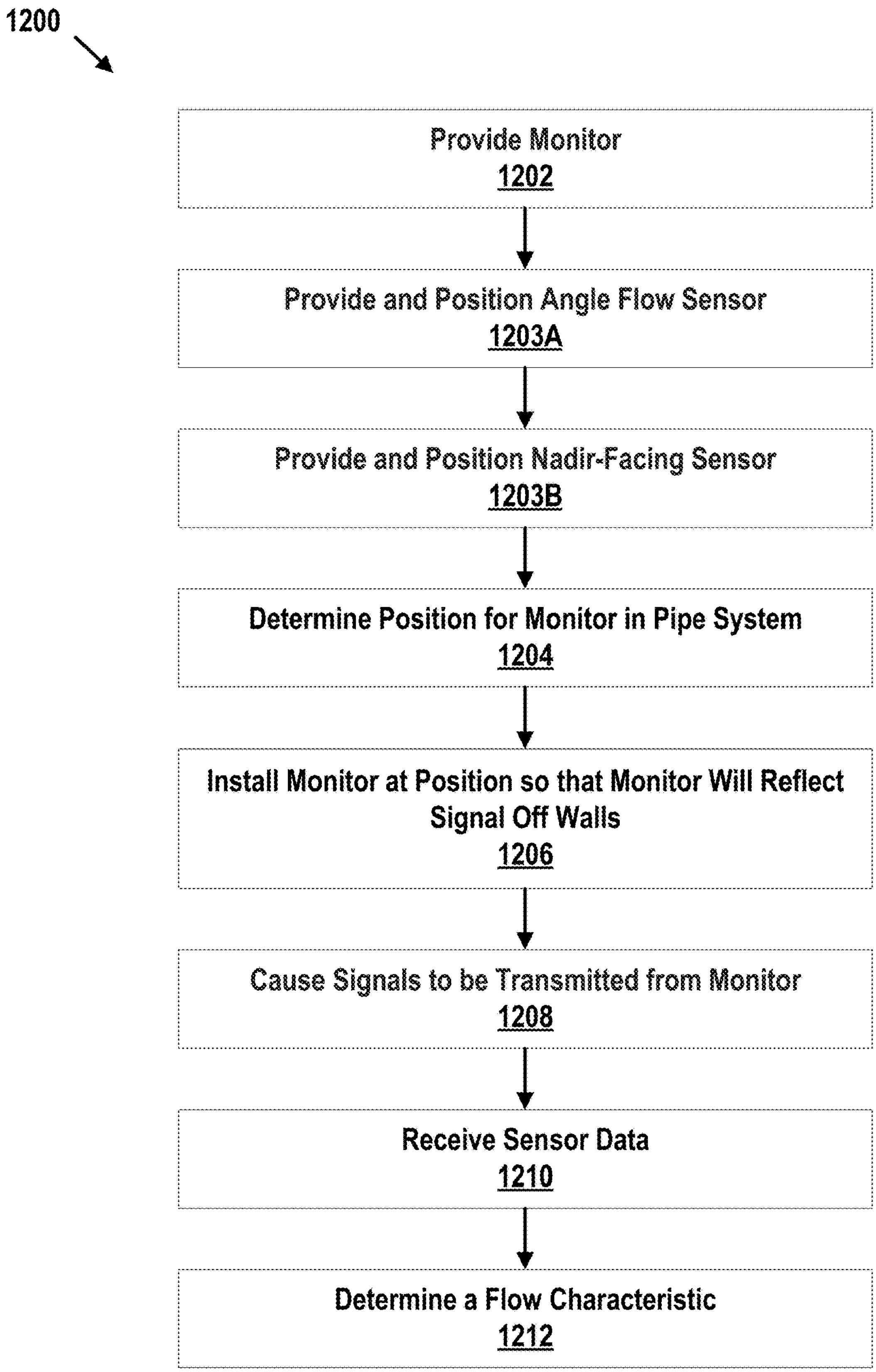
FIG. 12 is a flow chart for an example method of using a radar system that is configured to reflect angled radar signals off of walls, in accordance with some embodiments discussed herein.

Turning now to FIG. 12, a flow chart is provided for an example method of using a radar system in a non-pressurized pipe system where the radar system is configured to reflect angled radar signals off of walls. In operation 1202, a monitor is provided. The monitor may be similar to any of the monitors described herein. The monitor may include processing circuitry, and the monitor may also have a nadir-facing sensor. The angle flow sensor and the nadir-facing sensor are both radar sensors. The monitor comprises a first portion defining a first wall and a second portion defining a second wall. The first wall is sloped at an angle relative to the second wall, and the first portion has an increased cross-sectional size relative to the second portion.

At operation 1203A, an angle flow sensor is provided, and this angle flow sensor is a radar sensor. Also at operation 1203A, the angle flow sensor is positioned in the monitor. The angle flow sensor is positioned at the first portion proximate to the first wall so that the angle flow sensor is configured to emit angled radar signals through the first wall when activated.

At operation 1203B, a nadir-facing sensor is provided, and this nadir-facing sensor is a radar sensor. Also at operation 1203B, the nadir-facing sensor is positioned in the monitor. The nadir-facing sensor is positioned in the monitor at the second portion proximate to the second wall so that the nadir-facing sensor is configured to emit radar signals through the second wall when activated.

At operation 1204, a position for the monitor in the non-pressurized pipe system may be determined. This position may be selected at a height sufficiently elevated above any fluid in the non-pressurized pipe system. The position may be validated by using the equations 1-3 as discussed herein in reference to FIG. 4B. The determined position may include a rotational position or orientation and a Cartesian position in some embodiments.

At operation 1206, the monitor is installed at the position so that the monitor is configured to reflect radar signals off of a wall in the non-pressurized pipe system. The monitor may be installed at the position by causing the monitor to shift up or down in an automated or semi-automated manner in some embodiments. In some embodiments, the monitor may be installed at the position by manually assembling the monitor with other components so that the monitor is provided in the position.

At operation 1208, transmission of signals from the monitor is caused. By doing so, the radar signals may be directed towards a wall such as a sewer wall, and the radar signals may be reflected off of the wall towards the fluid below. Upon reaching the fluid, some of the radar signals are reflected back towards the monitor. At operation 1210, sensor data is received. This sensor data may be obtained once return signals are received at the monitor. Sensor data may be received for signals transmitted from the angle flow sensor. In embodiments where a nadir-facing sensor is present, sensor data may also be received for signals transmitted from the nadir-facing sensor. At operation 1212, a flow characteristic may be determined. This flow characteristic may be a flow rate, a velocity, or a fluid level in some embodiments, but other flow characteristics may also be used.

It should be understood that the operations of the methods described above may be performed in any order unless specified otherwise, and some operations may be performed simultaneously. Additionally, operations may be added, and certain operations may be omitted without departing from the scope of the invention. For example, additional transmit signals may be transmitted, or only one transmit signal may be transmitted.

The present invention has been described and illustrated with respect to a number of exemplary embodiments thereof. It should be understood by those skilled in the art from the foregoing that various other changes, omissions and additions may be made therein, without departing from the spirit and scope of the present invention, with the scope of the present invention being described by the foregoing claims.

What is claimed is:

1. A system for observing a flow characteristic of a fluid comprising:

at least one radar sensor that is a Multiple-Input Multiple Output phase radar sensor configured to create a virtual array; and processing circuitry, wherein the at least one radar sensor is both provided at a distance above the fluid, wherein the processing circuitry is configured to receive sensor data from the at least one radar sensor, wherein the sensor data includes at least one of a fluid speed or a fluid surface level, and wherein the processing circuitry is configured to determine the flow characteristic based upon the sensor data.

2. The system of claim 1, further comprising:

a monitor, wherein the at least one radar sensor includes a first radar sensor and a second radar sensor that are both positioned in the monitor.

3. The system of claim 2, wherein the monitor comprises a first portion defining a first wall and a second portion defining a second wall, wherein the first wall is sloped at an angle relative to the second wall, wherein the first portion has an increased cross-sectional size relative to the second portion, and wherein the first radar sensor is positioned in the first portion proximate to the first wall and is configured to emit angled radar signals through the first wall.

4. The system of claim 3, wherein the second radar sensor is positioned in the second portion proximate to the second wall and is configured to emit radar signals through the second wall.

5. The system of claim 1, wherein the system is configured to generate a three-dimensional image using the sensor data.

6. The system of claim 1, wherein the first radar sensor is an angle flow sensor that is configured to transmit radar signals that reflect off of a vertically-extending wall.

7. The system of claim 1, further comprising:

a plurality of monitors, wherein each monitor of the plurality of monitors comprises one or more radar sensors.

8. The system of claim 1, wherein the at least one radar sensor comprises a plurality of transmitters and receivers.

9. The system of claim 1, wherein the at least one radar sensor comprises plurality of transceivers.

10. The system of claim 1, further comprising:

an inertial measurement sensor.

11. The system of claim 1, wherein the at least one radar sensor is configured to operate at a frequency of 50 GHz or higher.

12. The system of claim 11, wherein a radar sensor of the at least one radar sensor is configured to operate at a frequency of 77 GHz or higher.

13. The system of claim 1, wherein the processing circuitry is configured to utilize machine learning to identify flood overflow conditions and also determine flow properties utilizing at least one of the fluid speed, the fluid surface level, and data regarding the surrounding environment.

14. The system of claim 1, wherein the at least one radar sensor includes an angle flow sensor that is configured to transmit radar signals that reflect off of a wall or a reflector on the wall.

15. A method for using a monitor, the method comprising:

providing the monitor that includes processing circuitry and that is configured to be positioned at a distance above a fluid being measured;

providing at least one radar sensor that is a Multiple-Input Multiple-Output radar sensor configured to create a virtual array;

positioning the at least one radar sensor in the monitor; and installing the monitor at a position so that the at least one radar sensor is configured to direct signals to a fluid, wherein the processing circuitry is configured to receive sensor data from the at least one radar sensor, and wherein the sensor data includes at least one of a fluid speed or a fluid surface level.

16. The method of claim 15, further comprising:

causing signals to be transmitted from the monitor; and determining a flow characteristic based upon the sensor data.

17. The method of claim 15, wherein installing the monitor at the position is done so that a radar sensor of the at least one radar sensor directs signals towards a fluid by reflecting the signals off of a wall in a non-pressurized pipe system.

18. The method of claim 17, wherein the position is higher above the fluid in the non-pressurized pipe system relative to an alternative position where the monitor is configured to direct radar signals into the fluid without reflecting radar signals off of a wall.

19. The method of claim 15, wherein the monitor comprises a first portion defining a first wall and a second portion defining a second wall, wherein the first wall is sloped at an angle relative to the second wall, wherein the first portion has an increased cross-sectional size relative to the second portion, and wherein the angle flow sensor is positioned in the monitor at the first portion proximate to the first wall so that the angle flow sensor is configured to emit angled radar signals through the first wall when activated.

20. The method of claim 19, wherein the nadir-facing sensor is positioned in the monitor at the second portion proximate to the second wall so that the nadir-facing sensor is configured to emit radar signals through the second wall when activated.

* * * * *